United States Patent
Khodadadzadeh et al.

(10) Patent No.: US 12,474,269 B1
(45) Date of Patent: Nov. 18, 2025

(54) DEVICE, METHOD, AND SYSTEM FOR SAMPLE ANALYSIS

(71) Applicant: Vital Biosciences, Inc., Mississauga (CA)

(72) Inventors: Iman Khodadadzadeh, Toronto (CA); Farnoud Kazemzadeh, Waterloo (CA)

(73) Assignee: VITAL BIOSCIENCES INC., Mississauga (CA)

( * ) Notice: Subject to any disclaimer, the term of this patent is extended or adjusted under 35 U.S.C. 154(b) by 1075 days.

(21) Appl. No.: 17/371,746

(22) Filed: Jul. 9, 2021

Related U.S. Application Data

(60) Provisional application No. 63/050,664, filed on Jul. 10, 2020.

(51) Int. Cl.
*G01N 21/64* (2006.01)
*G01N 15/01* (2024.01)
(Continued)

(52) U.S. Cl.
CPC ......... *G01N 21/6458* (2013.01); *G01N 15/01* (2024.01); *G01N 15/1434* (2013.01);
(Continued)

(58) Field of Classification Search
CPC .... G01N 15/01; G01N 15/1434; G01N 21/47; G01N 21/6428; G01N 21/6458; G01N 2015/012; G01N 2015/016; G01N 2015/018; G01N 2015/1486; G01N 2021/6439; G01N 2201/06113;
(Continued)

(56) References Cited

U.S. PATENT DOCUMENTS 8,334,982 B2 * 12/2012 Fang-Yen .......... G01B 9/02063
  356/497
9,772,282 B2 * 9/2017 Tucker-Schwartz ........................
  G01N 21/6486
(Continued)

FOREIGN PATENT DOCUMENTS

WO  WO-2019016169 A1 *  1/2019 ............. G01N 15/14
WO  WO-2019058152 A1 *  3/2019 ......... G01N 15/1436
(Continued)

*Primary Examiner* — Mark R Gaworecki
(74) *Attorney, Agent, or Firm* — Morgan, Lewis & Bockius LLP

(57) ABSTRACT

Methods and devices for analyzing a sample from a subject are provided. A device includes one or more coherent light sources and one or more partially coherent light sources. The light sources are configured to emit first and second wavelengths of electromagnetic radiation towards an imaging chamber configured to hold blood cells. The light sources are aligned to illuminate a single common area of the imaging chamber. The device includes optics positioned to receive light from the imaging chamber, and a detector in optical communication with the optics. The detector is configured to detect fluorescence emission and backscatter from blood cells when present in the imaging chamber. The device includes mixers/unmixers configured to replicate and mix first and second signals representative of the responses to the first and second wavelengths after interacting with the plurality of blood cells to generate spectro-spatial responses.

8 Claims, 18 Drawing Sheets
(15 of 18 Drawing Sheet(s) Filed in Color)

(51) Int. Cl.
  *G01N 15/1434* (2024.01)
  *G01N 21/47* (2006.01)
  *G02B 21/06* (2006.01)
  *G02B 21/16* (2006.01)
  *G06N 5/04* (2023.01)
  *G06N 20/00* (2019.01)
  *G01N 15/14* (2006.01)

(52) U.S. Cl.
  CPC ......... *G01N 21/47* (2013.01); *G01N 21/6428* (2013.01); *G02B 21/06* (2013.01); *G02B 21/16* (2013.01); *G06N 5/04* (2013.01); *G06N 20/00* (2019.01); *G01N 2015/012* (2024.01); *G01N 2015/016* (2024.01); *G01N 2015/1486* (2013.01); *G01N 2021/6439* (2013.01); *G01N 2201/06113* (2013.01); *G01N 2201/062* (2013.01)

(58) Field of Classification Search
  CPC .. G01N 2201/062; G02B 21/06; G02B 21/16; G06N 5/04; G06N 20/00
  See application file for complete search history.

(56) References Cited

U.S. PATENT DOCUMENTS

| | | | |
|---|---|---|---|
| 2004/0147034 A1* | 7/2004 | Gore | A61B 5/1459 436/171 |
| 2009/0009759 A1* | 1/2009 | Backman | G01J 3/0208 356/303 |
| 2012/0164719 A1* | 6/2012 | Levine | G01N 21/6428 435/288.7 |
| 2013/0094750 A1* | 4/2013 | Tasdizen | G06V 20/695 382/134 |
| 2017/0138849 A1* | 5/2017 | Tucker-Schwartz | G01N 21/49 |
| 2018/0188151 A1* | 7/2018 | Tucker-Schwartz | G01N 33/4915 |
| 2019/0056304 A1* | 2/2019 | Gershtein | G01N 21/6456 |
| 2019/0339203 A1* | 11/2019 | Miller | G01J 3/2823 |
| 2020/0158615 A1* | 5/2020 | Shi | G01N 15/0205 |

FOREIGN PATENT DOCUMENTS

| | | | | |
|---|---|---|---|---|
| WO | WO-2020028313 A1 * | 2/2020 | | G01N 15/1433 |
| WO | WO-2020037070 A1 * | 2/2020 | | B01L 3/502715 |

* cited by examiner

Model used:
y = 1.121 x − 0.622; r² = 0.879

Model used:
y = 0.911 x + 18.52; $r^2$ = 0.986

Model used:
y = 1.001 x - 0.063; r² = 0.988

Model used:
$y = x + 1.1; r^2 = 0.922$

Model used:
y = 0.976 x - 2.575; r² = 0.915

Model used:
y = 0.846 x + 0.988; r² = 0.757

Model used:
y = 1.048 x + 0.045; r² = 0.966

Model used:
y = 1.166 x - 2.064; r² = 0.09

DEVICE, METHOD, AND SYSTEM FOR SAMPLE ANALYSIS

CROSS REFERENCE TO RELATED APPLICATIONS

The present application claims priority to U.S. Provisional Patent Application No. 63/050,664, filed Jul. 10, 2020, which is incorporated by reference herein, in its entirety, for all purposes.

BACKGROUND

The vast majority of hematology analyzers use flow cytometry to count cells passing through an aperture one at a time. As they pass through the aperture, their optical and/or conductive properties are measured to enable rapid measurement of cell count, size, and type. This technology has greatly facilitated the processing of normal samples. However, when something potentially abnormal is detected by these instruments, the abnormality is flagged and the sample needs to be analyzed manually by highly skilled personnel who stain and image the cells (e.g., using higher magnification).

BRIEF SUMMARY OF THE INVENTION

Given the above background, there is a need in the art for improved methods and systems for hematology analysis. For instance, there is a need for methods and system that can automate cell count, size, and type directly through imaging without the need for highly magnified morphological assessment. The present disclosure solves these and other needs in the art by providing methods and systems that differentiate blood cell types using various imaging techniques.

For example, in one aspect, the present disclosure provides a device for analyzing a sample. The device includes one or more coherent light sources and one or more partially coherent light sources, wherein the light sources are collectively configured to emit a first wavelength of electromagnetic (EM) radiation and a second wavelength of EM radiation towards an imaging chamber configured to hold blood cells. The one or more coherent light sources and the one or more partially coherent light sources are aligned to illuminate a single common area of the imaging chamber. The device also includes one or more optics positioned to receive light from the imaging chamber. The device also includes one or more detectors in optical communication with the one or more optics. The one or more detectors are configured to detect (i) fluorescence emission, and (ii) EM radiation backscatter from, and/or EM radiation transmission through, a plurality of blood cells when present in the imaging chamber. The device also includes one or more mixers/unmixers configured to replicate and mix first signals and second signals, received by the one or more detectors, to generate a set of spectro-spatial responses, where the first signals and the second signals are representative of the responses to the first wavelength of EM radiation and the second wavelength of EM radiation, respectively, after interacting with the plurality of blood cells.

Generally, any wavelengths can be used in the methods and systems described herein. In some embodiments, the one or more lights sources emit light at a wavelength independently selected from the group consisting of 405 nanometers (nm), 520 nm, and 638 nm. In some embodiments, the one or more coherent light sources comprises one or more light sources. In some embodiments, the one or more coherent light sources and the one or more partially coherent light sources are independently selected from the group consisting of LEDs and lasers. In some embodiments, the one or more partially coherent light sources are arranged in a symmetrical pattern with respect to the imaging chamber.

In some embodiments, the device includes a non-transitory computer readable medium comprising instructions that, when executed by a processor, perform a machine learning algorithm to count, size and/or speciate one or more cell types in the sample.

In some embodiments, the one or more optics of the device have a magnification of no more than about 10×.

In one aspect, the disclosure provides a method for analyzing a sample. The method includes emitting a first wavelength of electromagnetic (EM) radiation towards a biological sample comprising blood cells, and receiving, at a plurality of receivers arranged in a spatial pattern, responses to the first wavelength of EM radiation after the first wavelength of EM radiation interacts with the biological sample. The method also includes emitting a second wavelength of EM radiation towards the biological sample, and receiving, at the plurality of receivers, responses to the second wavelength of EM radiation after the second wavelength of EM radiation interacts with the biological sample. The method then includes performing processing on first signals representative of the received responses to the first wavelength of EM radiation and second signals representative of the received responses to the second wavelength of EM radiation, the processing including replicating and mixing the first signals and the second signals to generate a set of spectro-spatial responses.

In some embodiments, the biological sample includes blood cells, e.g., red blood cells, white blood cells, and platelets. Accordingly, in some embodiments, the set of spectro-spatial responses provides a count of red blood cells, platelets, and white blood cells for the biological sample. In some embodiments, the set of spectro-spatial responses provides a differential white blood cell count.

In some embodiments, the biological sample includes analytes present in urine, e.g., various types of crystals present in urine. Accordingly, in some embodiments, the set of spectro-spatial responses provides identification of the types of crystals present in a urine sample. For information on the analysis of crystals present in urine see, for example, Fazil Marickar, Y. M., Lekshmi, P. R., Varma, L. et al. Elemental distribution analysis of urinary crystals. Urol Res 37, 277-282 (2009), the content of which is incorporated herein by reference, in its entirety, for all purposes.

In some embodiments, the method also includes emitting a third wavelength of EM radiation towards the biological sample, and receiving, at the plurality of receivers, responses to the third wavelength of EM radiation after the third wavelength of EM radiation interacts with the biological sample. Accordingly, in some embodiments, the processing is further performed on third signals representative of the received responses to the third wavelength of EM radiation.

In some embodiments, the method also includes emitting a fourth wavelength of EM radiation towards the biological sample, and receiving, at the plurality of receivers, responses to the fourth wavelength of EM radiation after the fourth wavelength of EM radiation interacts with the biological sample. Accordingly, in some embodiments, the processing is further performed on fourth signals representative of the received responses to the fourth wavelength of EM radiation.

In some embodiments, the method also includes emitting a fifth wavelength of EM radiation towards the biological sample, and receiving, at the plurality of receivers, responses to the fifth wavelength of EM radiation after the fifth wavelength of EM radiation interacts with the biological sample. Accordingly, in some embodiments, the processing is further performed on fifth signals representative of the received responses to the fifth wavelength of EM radiation.

In some embodiments, the method includes using machine learning to count, size and/or speciate one or more cells in the sample.

In some embodiments, the first wavelength of EM radiation is configured for detection of a nucleic acid stain applied to the blood cells.

In some embodiments, the second wavelength of EM radiation is configured for detection of an immuno-stain directed against a cell-surface antigen. In some embodiments, the cell-surface antigen is selected from the group consisting of CD45, CD14, and CD123.

In one aspect, the disclosure provides a cartridge for containing a sample for analysis. The cartridge includes a sample chamber for receiving a sample comprising a first analyte and a second analyte. The cartridge also includes a first analysis chamber fluidically coupled to the sample chamber by a first conduit, where the cartridge is configured to permit passage of the first blood cell type, but not the second blood cell type, from the sample chamber to the first imaging chamber. For example, in some embodiments, a first blood cell type, e.g., red blood cells, are excluded from the first analysis chamber by physio-chemical depletion process. Likewise, in some embodiments, a cross-sectional area of the first conduit is sufficient to permit passage of a first analyte (e.g., a first blood cell type), but not a second analyte (e.g., a second blood cell type), from the sample chamber to the first analysis chamber. The cartridge also includes a second analysis chamber fluidically coupled to the sample chamber by a second conduit. In some embodiments, a depth of the first conduit and/or the second conduit is governed by a spacer. The cartridge is optically transparent from at least one side.

In one aspect, the disclosure provides a system for analyzing a sample. The system includes a device for analyzing a sample. The device includes one or more coherent light sources, and one or more partially coherent light sources, configured to emit a first wavelength of electromagnetic (EM) radiation and a second wavelength of EM radiation towards an imaging chamber configured to hold blood cells. The one or more coherent light sources and the one or more partially coherent light sources are aligned to illuminate a single common area of the imaging chamber. The device also includes one or more optics positioned to receive light from the imaging chamber. The device also includes one or more detectors in optical communication with the one or more optics, where the one or more detectors are configured to detect (i) fluorescence emission, and (ii) backscatter from a plurality of blood cells when present in the imaging chamber. The device also includes one or more mixers/unmixers configured to replicate and mix first signals and second signals, received by the one or more detectors, to generate a set of spectro-spatial responses, where the first signals and the second signals are representative of the responses to the first wavelength of EM radiation and the second wavelength of EM radiation, respectively, after interacting with the plurality of blood cells. The system also includes a cartridge configured to hold blood cells for analysis. The cartridge includes a sample chamber for receiving a sample comprising a first blood cell type and a second blood cell type. The cartridge also includes a first imaging chamber fluidically coupled to the sample chamber by a first conduit, where the cartridge is configured to permit passage of the first blood cell type, but not the second blood cell type, from the sample chamber to the first imaging chamber. For example, in some embodiments, a first blood cell type, e.g., red blood cells, are excluded from the first analysis chamber by physio-chemical depletion process. Likewise, in some embodiments, a cross-sectional area of the first conduit is sufficient to permit passage of a first analyte (e.g., a first blood cell type), but not a second analyte (e.g., a second blood cell type), from the sample chamber to the first analysis chamber. The cartridge also includes a second imaging chamber fluidically coupled to the sample chamber by a second conduit. In some embodiments, the depth of the first conduit and/or the second conduit is governed by a spacer. The cartridge is optically transparent from at least one side.

In one aspect, the disclosure provides a method for analyzing blood. The method includes obtaining a first plurality of pixelated images of a first imaging chamber holding a first plurality of blood cells from a biological sample, where each respective pixelated image in the first plurality of pixelated images is collected at a different wavelength of electromagnetic (EM) radiation in a first plurality of wavelengths of EM radiation. The method also includes identifying, for each respective blood cell in the first plurality of blood cells, a corresponding set of pixels in each respective pixelated image in the first plurality of pixelated images corresponding to the respective blood cell. The method also includes determining, for each respective blood cell in the first plurality of blood cells, a corresponding imaging feature of the respective blood cell from each respective pixelated image in the first plurality of pixelated images based on pixel values for the corresponding set of pixels corresponding to the respective blood cell in the respective pixelated image, thereby obtaining a corresponding set of imaging features for each respective blood cell in the first plurality of blood cells. The method also includes applying, to each corresponding set of imaging features for each respective blood cell in the first plurality of blood cells, a first model for identifying a type of the respective blood cell, thereby determining an aggregate count of each blood cell type present in the first plurality of blood cells.

In some embodiments, the first model distinguishes between red blood cells and platelets. In some embodiments, the first model distinguishes between red blood cells, white blood cells, and platelets. In some embodiments, the first model is a machine learning model.

In some embodiments, the method also includes obtaining a second plurality of pixelated images of a second imaging chamber holding a second plurality of blood cells from the biological sample, where each respective pixelated image in the second plurality of pixelated images is collected at a different wavelength of electromagnetic (EM) radiation in a second plurality of wavelengths of EM radiation. In some such embodiments, the method includes identifying, for each respective blood cell in the second plurality of blood cells, a corresponding set of pixels in each respective pixelated image in the second plurality of pixelated images corresponding to the respective blood cell. Accordingly, in some embodiments, the method includes determining, for each respective blood cell in the second plurality of blood cells, a corresponding imaging feature of the respective blood cell from each respective pixelated image in the second plurality of pixelated images based on pixel values for the corresponding set of pixels corresponding to the respective blood cell in the respective pixelated image, thereby obtaining a corresponding set of imaging features for each respective blood cell in the second plurality of blood cells. In some embodiments, the method then includes applying, to each corresponding set of imaging features for each respective blood cell in the second plurality of blood cells, a second model for identifying a type of the respective blood cell, thereby determining an aggregate count of each blood cell type present in the second plurality of blood cells.

In some embodiments, the second model distinguishes between different types of white blood cells. In some embodiments, the second model distinguishes between neutrophils, lymphocytes, monocytes, eosinophils, and basophils. In some embodiments, the second model is a machine learning model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various features, objects, and advantages of the present invention will be described in connection with the accompanying drawings, which are incorporated in and constitute a part of this disclosure. The drawings illustrate exemplary embodiments of the invention and do not therefore limit its scope. In the drawings:

FIG. 4A shows a cell field imaged at a first wavelength (top panel) and a pseudo-color image of the same cell field after identification of the different cell types present in the field. FIG. 4B shows component images used to differentiate cell types in the image field.

DETAILED DESCRIPTION

In certain embodiments, the present disclosure provides a microscope system to analyze cells within a biological specimen (e.g., a blood sample, a plasma sample, a buffy coat sample, or the like) without the need for highly magnified morphological assessment. This analysis is done based on a multitude of information from cell surface specific markers to their DNA/RNA's as well as their internal structure. A combination of spatial and temporal information about these cells allowed for the identification, counting and speciation of different types of cells within the target specimen in a fast and reliable manner.

Certain embodiments of the present disclosure allow for the enumeration and identification of different cell types within the target analyte in a fast and reliable manner. Most microscopy systems utilize high magnifications to distinguish different cell types based on their microscopic morphological features. The proposed invention allows for identification of different cell types at relatively low magnifications (10X or lower) based on a group of fluorescent markers as well as optical scattering properties of different cell types within a static flow cell.

In certain embodiments, the devices, systems and methods of the present disclosure comprise a disposable flow cell within which, the sample is loaded. The sample is processed and tagged with the fluorescent markers of interest and these markers includes but not limited to cell surface antigens and DNA/RNA stains. Then the flow cell is loaded onto a digital microscopy system that captures a multidimensional dataset of spatio-temporal information about the sample. Based on the information, the data is analyzed to identify the total number of cells within the analyte as well as their species. One application of this system is for analyzing red blood cells (RBCs), platelets, white blood cells (WBCs) and their different types.

Exemplary System Embodiments

Figure 1A:
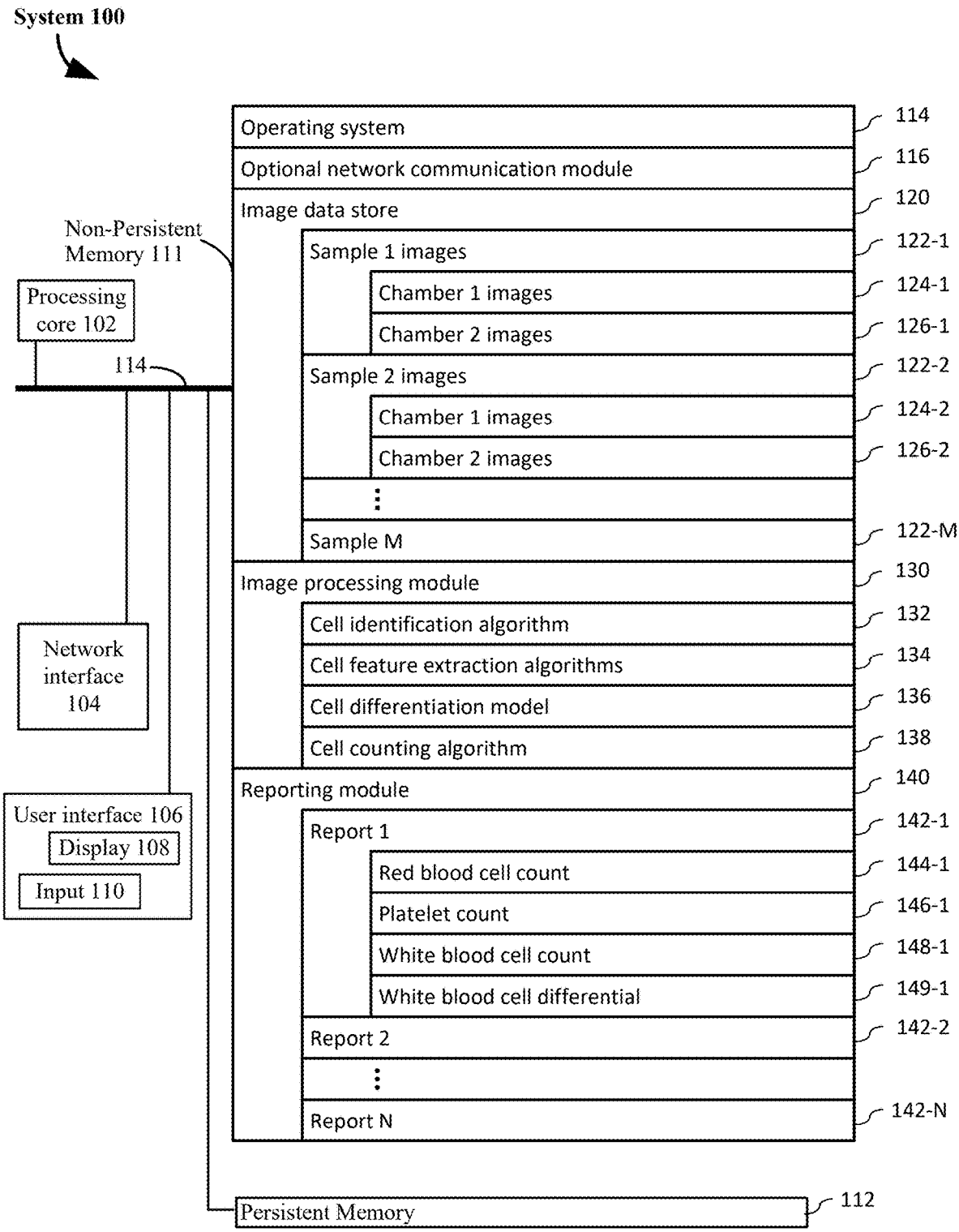
FIGS. 1A and 1B collectively illustrate a block diagram of example functional components of a digital microscope, in accordance with various embodiments of the present disclosure, and their respective interactions.
Figure 1B:
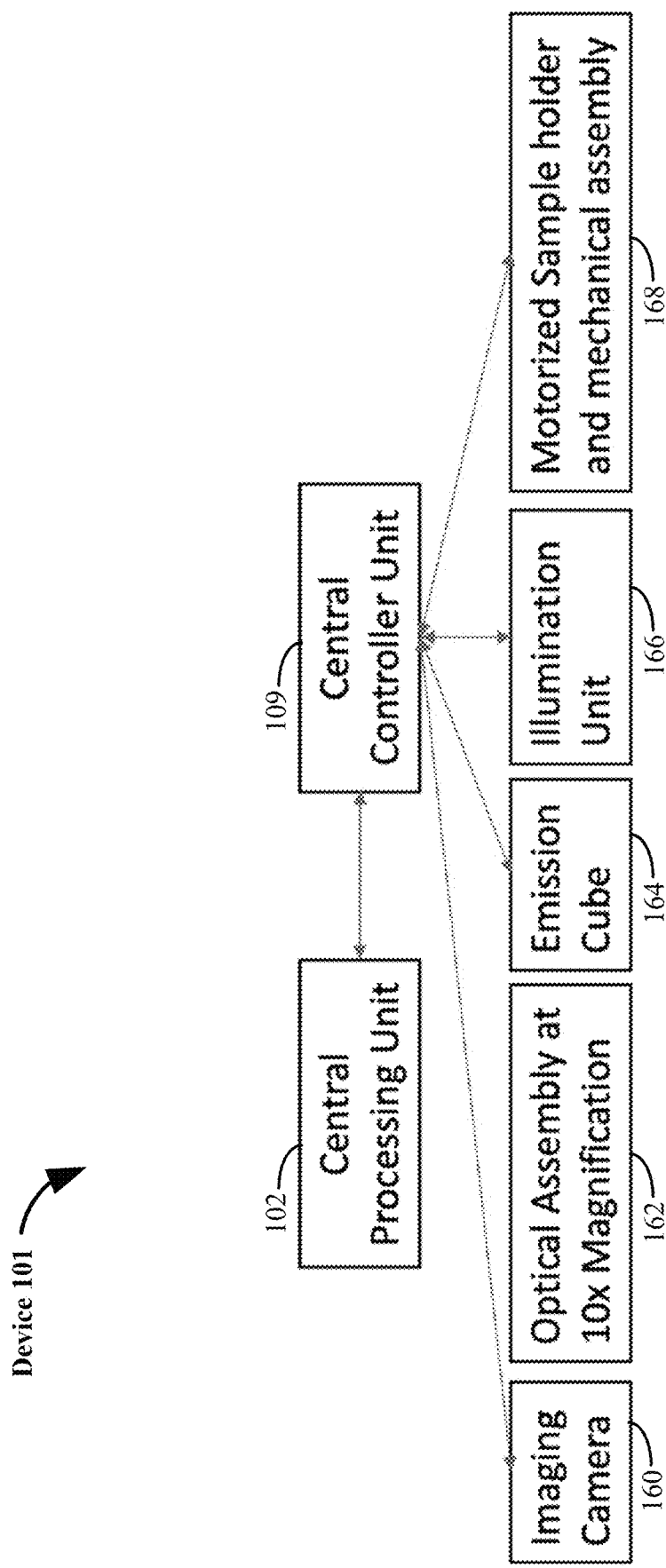

Now that an overview of some aspects of the present disclosure have been provided, details of an exemplary system are described in conjunction with FIGS. 1A-1B. FIGS. 1A-1B collectively provide a block diagram illustrating a device 101 for analyzing blood cell compositions, including computing system 100, in accordance with some embodiments of the present disclosure. In FIGS. 1A-1B, the system 100 is illustrated as a computing device. Of course, other topologies of the computer system 100 are possible. For instance, in some embodiments, the system 100 can in fact constitute several computer systems that are linked together in a network, or be a virtual machine or a container in a cloud computing environment. As such, the exemplary topology shown in FIG. 1A merely serves to describe the features of an embodiment of the present disclosure in a manner that will be readily understood to one of skill in the art.

Referring to FIG. 1, in some embodiments a computer system 100 (e.g., a computing device) includes a network interface 104. In some embodiments, the network interface 104 interconnects the system 100 computing devices within the system with each other, as well as optional external systems and devices, through one or more communication networks (e.g., through optional network communication module 118). In some embodiments, the network interface 104 optionally provides communication through optional network communication module 118 via the Internet, one or more local area networks (LANs), one or more wide area networks (WANs), other types of networks, or a combination of such networks.

Examples of networks include the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The system 100 in some embodiments includes one or more processing units (CPU(s)) 102 (e.g., a processor, a processing core, etc.), one or more network interfaces 104, a user interface 106 including (optionally) a display 108 and an input system 110 (e.g., an input/output interface, a keyboard, a mouse, etc.) for use by the user, memory (e.g., non-persistent memory 111, persistent memory 112), and one or more communication buses 114 for interconnecting the aforementioned components. The one or more communication buses 114 optionally include circuitry (sometimes called a chipset) that interconnects and controls communications between system components. The non-persistent memory 111 typically includes high-speed random access memory, such as DRAM, SRAM, DDR RAM, ROM, EEPROM, flash memory, whereas the persistent memory 112 typically includes CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. The persistent memory 112 optionally includes one or more storage devices remotely located from the CPU(s) 102. The persistent memory 112, and the non-volatile memory device(s) within the non-persistent memory 112, include non-transitory computer readable storage medium. In some embodiments, the non-persistent memory 111 or alternatively the non-transitory computer readable storage medium stores the following programs, modules and data structures, or a subset thereof, sometimes in conjunction with the persistent memory 112:

- an optional operating system 116 (e.g., ANDROID, IOS, DARWIN, RTXC, LINUX, UNIX, OS X, WINDOWS, or an embedded operating system such as VxWorks), which includes procedures for handling various basic system services and for performing hardware dependent tasks;
- an optional network communication module (or instructions) 118 for connecting the system 100 with other devices and/or a communication network;
- an image data store 120 for storing pixelated images, e.g., digital images, for one or more samples 122, for instance a first plurality of pixelated images 124 of a first sample chamber and a second plurality of pixelated images 126 of a second sample chamber. In some embodiments, an image set for a sample 122 includes a plurality of images of a sample, collected at different wavelengths, from a single sample chamber;
- an image processing module 130 including one or more of:
  - a cell identification algorithm 132 for identifying pixel sets in images 122 corresponding to individual cells present in a biological sample;
  - a cell feature extraction algorithm 134 for determining cell imaging features for individual cells present in a biological sample based on pixel values for pixel sets identified, e.g., using cell identification algorithm 132;
  - one or more cell differentiation models 136 for differentiating between cell types (e.g., different types of blood cells, such as red blood cells, white blood cells, and platelets) based on cell imaging features for individual cells present in a biological sample, e.g., determined using cell feature extraction algorithm 134; and
  - cell counting algorithm 138 for obtaining an aggregate count for each cell type present in a biological sample, e.g., determined using cell differentiation models 136; and
- optional reporting module 140 for generating a report 142 on the cell composition for a biological sample, e.g., for a blood sample the report 142 may containing one or more of:
  - a red blood cell count 144;
  - a platelet count 146;
  - a white blood cell count 148; and
  - a white blood cell differential 149.

In various embodiments, one or more of the above identified elements are stored in one or more of the previously mentioned memory devices, and correspond to a set of instructions for performing a function described above. The above identified modules, data, or programs (e.g., sets of instructions) need not be implemented as separate software programs, procedures, datasets, or modules, and thus various subsets of these modules and data may be combined or otherwise re-arranged in various implementations. In some implementations, the non-persistent memory 111 optionally stores a subset of the modules and data structures identified above. Furthermore, in some embodiments, the memory stores additional modules and data structures not described above. In some embodiments, one or more of the above identified elements is stored in a computer system, other than that of the system 100, that is addressable by the system 100 so that the system 100 may retrieve all or a portion of such data when needed.

Although FIG. 1A depicts a "system 100," the figure is intended more as a functional description of the various features that may be present in computer systems than as a structural schematic of the implementations described herein. In practice, and as recognized by those of ordinary skill in the art, items shown separately could be combined and some items could be separated. Moreover, although FIG. 1A depicts certain data and modules in non-persistent memory 111, some or all of these data and modules instead may be stored in persistent memory 112 or in more than one memory. For example, in some embodiments, at least image data store 120 is stored in a remote storage device which can be a part of a cloud-based infrastructure.

FIG. 1B depicts an example imaging system 101 for analyzing biological samples, e.g., blood cell compositions, urine analytes, etc., in accordance with various embodiments of the present disclosure. In some embodiments, imaging system includes optical components, such as an imaging camera 160 (e.g., one or more optical detectors) for acquiring images of cells held in one or more imaging chambers, an optical assembly 162 (e.g., one or more lens or lens complex for focusing and/or magnifying images received by the device), an optional wavelength filter (e.g., emission cube 164) for filtering light received by the imaging device to form a plurality of images at different wavelengths of light, and an optional motorized sample holder and/or mechanical assembly 168 for handling cassettes holding cells to be imaged.

In one embodiment, the disclosure provides a device for analyzing a sample, e.g., a biological sample containing cells of more than one type or a urine sample containing analytes (e.g., crystals). In some embodiments, the biological sample is a sample of blood cells, e.g., containing red blood cells (RBCs), white blood cells (WBCs), and platelets. In some embodiments, the device is configured to provide a complete blood count and/or a white blood cell differential analysis. In some embodiments, the biological sample includes analytes present in urine, e.g., various types of crystals present in urine. Accordingly, in some embodiments, the set of spectro-spatial responses provides identification of the types of crystals present in a urine sample.

The device includes one or more coherent light sources and one or more partially coherent light sources, configured to emit a first wavelength of electromagnetic (EM) radiation and a second wavelength of EM radiation towards an imaging chamber configured to hold cells, e.g., blood cells. In some embodiments, the device includes at least 2 coherent light sources configured to emit light at different wavelengths. In some embodiments, the device includes at least 3, 4, 5, 6, 7, 8, 9, 10, or more coherent light sources configured to emit light at different wavelengths. In some embodiments, the device includes at least 2 partially coherent light sources configured to emit light at different wavelengths. In some embodiments, the device includes at least 3, 4, 5, 6, 7, 8, 9, 10, or more partially coherent light sources configured to emit light at different wavelengths. The one or more coherent light sources and the one or more partially coherent light sources are aligned to illuminate a single common area of the imaging chamber. In some embodiments, the one or more partially coherent light sources are arranged in a symmetrical pattern with respect to the imaging chamber, e.g., in a circular pattern. In some embodiments, the one or more lights sources emit light at a wavelength independently selected from the group consisting of 405 nanometers (nm), 520 nm, and 638 nm. In some embodiments, the one or more light sources include respective light sources that are configured to emit light at one of 405 nm, 520 nm, and 638 nm. In some embodiments, the one or more partially coherent light sources is one or more light emitting diodes (LEDs).

In some embodiments, the device is configured to acquire different types of images. For example, in some embodiments, the device is configured to acquire fluorescence emission from the sample (e.g., fluorescence emission from analytes in the sample, for instance blood cells or urine crystals), EM radiation backscatter from the sample (e.g., backscatter from analytes in the sample, for instance blood cells or urine crystals), EM radiation transmission through the sample (e.g., EM radiation transmission through analytes in the sample, for instance blood cells or urine crystals, from which absorption and/or attenuation values can be derived), bright field imaging of the sample (e.g., for autofocusing of the device), etc. In some embodiments, absorption values derived from transmission images is used to determine analyte volumes (e.g., cell volumes or urine crystal volumes).

The device includes one or more optics, e.g., a lens or lens complex, positioned to receive light from the imaging chamber. In some embodiments, the one or more optics include a magnification lens or lens complex. In some embodiments, the magnification lens or lens complex has a magnification of less than about 10×. In some embodiments, the magnification lens or lens complex has a magnification of less than about 5×, 10×, 15×, 20×, 25×, 30×, 40×, 50×, 75×, 100×, or greater.

The device includes one or more detectors in optical communication with the one or more optics. The one or more detectors are configured to detect (i) fluorescence emission, and (ii) EM radiation backscatter from, and/or EM radiation transmission through, a sample (e.g., for a plurality of analytes in the sample, e.g., blood cells or urine crystals), when present in the imaging chamber. In some embodiments, the one or more detectors are configured to collect images at different wavelengths, e.g., through coupling with one or more tunable or fixed optical filers.

In some embodiments, the device is configured to detect (i) fluorescence emission, and (ii) EM radiation backscatter from the sample, (e.g., containing a plurality of blood cells or a plurality of urine crystals) when present in the imaging chamber. Generally, fluorescence emission and EM radiation backscatter are imaged by irradiating the sample with EM radiation from a first side and collecting an image of the sample from the same side of the sample. That is, where the illumination source and the detector are located on the same side of the sample. Accordingly, in some embodiments, the device includes one or more detectors positioned on a first side of an imaging stage or chamber and one or more EM radiation sources positioned on the first side of the imaging stage or chamber.

In some embodiments, the device is configured to detect (i) fluorescence emission, (ii) EM radiation backscatter from the sample, (e.g., containing a plurality of blood cells or a plurality of urine crystals), and (iii) EM radiation transmission through the sample (e.g., for bright field imaging and/or absorption measurements). In contract to fluorescence emission, and EM radiation backscatter, EM radiation transmission is imaged by irradiating the sample with EM radiation from a first side and collecting an image of the sample from the opposite side of the sample. That is, where the illumination source and the detector are located on different sides of the sample. Accordingly, in some embodiments, the device includes one or more detectors positioned on a first side of an imaging stage or chamber, one or more EM radiation sources positioned on the first side of the imaging stage or chamber (e.g., to facilitate imaging of fluorescence emission and EM radiation backscatter), and one or more EM radiation sources positioned on a second side (the opposite side as the first side) of the imaging stage or chamber (e.g., to facilitate bright field and/or transmission imaging). In some embodiments, the device includes one or more detectors positioned on a first side of an imaging stage or chamber (e.g., to facilitate imaging of fluorescence emission and EM radiation backscatter), one or more detectors positioned on a second side (the opposite side as the first side) of the imaging stage or chamber (e.g., to facilitate bright field and/or transmission imaging), and one or more EM radiation sources positioned on the first side of the imaging stage or chamber.

The device also includes one or more mixers/unmixers, e.g., algorithms stored in non-persistent memory 111, configured to replicate and mix first signals and second signals, received by the one or more detectors, to generate a set of spectro-spatial responses, wherein the first signals and the second signals are representative of the responses to the first wavelength of EM radiation and the second wavelength of EM radiation, respectively, after interacting with the plurality of blood cells. In some embodiments, the one or more one or more mixers/unmixers include a non-transitory computer readable medium storing instructions that, when executed by a processor, perform a machine learning algorithm to count, size, and/or speciate one or more cell types in the sample.

Example System

In one embodiment, the disclosure provides a system for analyzing a sample, e.g., a biological sample containing cells of more than one type. In some embodiments, the biological sample is a sample of blood cells, e.g., containing red blood cells (RBCs), white blood cells (WBCs), and platelets. In some embodiments, the system is configured to provide a complete blood count and/or a white blood cell differential analysis. In some embodiments, the biological sample is a urine sample or fraction thereof. In some embodiments, the system is configured to identify and/or quantify different analytes, e.g., crystals, present in a urine sample.

The system includes a device for analyzing a sample. The device includes one or more coherent light sources and one or more partially coherent light sources, configured to emit a first wavelength of electromagnetic (EM) radiation and a second wavelength of EM radiation towards an imaging chamber configured to hold cells, e.g., blood cells. In some embodiments, the device includes at least 2 coherent light sources configured to emit light at different wavelengths. In some embodiments, the device includes at least 3, 4, 5, 6, 7, 8, 9, 10, or more coherent light sources configured to emit light at different wavelengths. In some embodiments, the device includes at least 2 partially coherent light sources configured to emit light at different wavelengths. In some embodiments, the device includes at least 3, 4, 5, 6, 7, 8, 9, 10, or more partially coherent light sources configured to emit light at different wavelengths. The one or more coherent light sources and the one or more partially coherent light sources are aligned to illuminate a single common area of the imaging chamber. In some embodiments, the one or more partially coherent light sources are arranged in a symmetrical pattern with respect to the imaging chamber, e.g., in a circular pattern. In some embodiments, the one or more lights sources emit light at a wavelength independently selected from the group consisting of 405 nanometers (nm), 520 nm, and 638 nm. In some embodiments, the one or more light sources include respective light sources that are configured to emit light at one of 405 nm, 520 nm, and 638 nm. In some embodiments, the one or more partially coherent light sources are LEDs.

The device includes one or more optics, e.g., a lens or lens complex, positioned to receive light from the imaging chamber. In some embodiments, the one or more optics include a magnification lens or lens complex. In some embodiments, the magnification lens or lens complex has a magnification of less than about 10×. In some embodiments, the magnification lens or lens complex has a magnification of less than about 5×, 10×, 15×, 20×, 25×, 30×, 40×, 50×, 75×, 100×, or greater.

The device includes one or more detectors in optical communication with the one or more optics. The one or more detectors are configured to detect (i) fluorescence emission, and (ii) backscatter from a plurality of blood cells when present in the imaging chamber. In some embodiments, the one or more detectors are configured to collect images at different wavelengths, e.g., through coupling with one or more tunable or fixed optical filers.

The device also includes one or more mixers/unmixers, e.g., algorithms stored in non-persistent memory 111, configured to replicate and mix first signals and second signals, received by the one or more detectors, to generate a set of spectro-spatial responses, wherein the first signals and the second signals are representative of the responses to the first wavelength of EM radiation and the second wavelength of EM radiation, respectively, after interacting with the plurality of blood cells. In some embodiments, the one or more one or more mixers/unmixers include a non-transitory computer readable medium storing instructions that, when executed by a processor, perform a machine learning algorithm to count, size, and/or speciate one or more cell types in the sample.

The device also includes a cartridge configured to hold blood cells for analysis. The cartridge includes a sample chamber for receiving a sample, e.g., including a first blood cell type and a second blood cell type. The cartridge also includes a first imaging chamber fluidically coupled to the sample chamber by a first conduit, where the cartridge is configured to permit passage of the first cell type, e.g., first blood cell type such as a red blood cell and/or platelet, but not the second cell type, e.g., a second blood cell type such as a white blood cell, from the sample chamber to the first imaging chamber. For example, in some embodiments, a first blood cell type, e.g., red blood cells, are excluded from the first analysis chamber by physio-chemical depletion process. Likewise, in some embodiments, a cross-sectional area of the first conduit is sufficient to permit passage of a first analyte (e.g., a first blood cell type), but not a second analyte (e.g., a second blood cell type), from the sample chamber to the first analysis chamber. The cartridge also includes a second imaging chamber fluidically coupled to the sample chamber by a second conduit. In some embodiments, a depth of the first conduit and/or the second conduit is governed by a spacer. The cartridge is optically transparent from at least one side, e.g., to facilitate imaging of cells in the biological sample.

Example Methodologies

A system 100 and imaging device 101 in accordance with various embodiments of the present disclosure is described above with reference to FIGS. 1A and 1B. Methods for analyzing a biological sample, e.g., a blood sample, which may be performed using system 100 and imaging device 101 described above, are detailed below, in accordance with various embodiments of the present disclosure.

In one embodiment, the disclosure provides a method for analyzing a biological sample, e.g., a biological sample containing cells of more than one type. In some embodiments, the biological sample is a sample of blood cells, e.g., containing red blood cells (RBCs), white blood cells (WBCs), and platelets. In some embodiments, the device is configured to provide a complete blood count and/or a white blood cell differential analysis. In some embodiments, the method is performed using a system 100 and/or imaging device 101, as described above.

The method includes emitting a first wavelength of electromagnetic (EM) radiation (e.g., using one or more coherent light sources and one or more partially coherent light sources as part of illumination unit 166) towards a biological sample containing a plurality of cell types, e.g., a plurality of blood cell types present in an imaging chamber. the biological sample is a sample of blood cells, e.g., containing red blood cells (RBCs), white blood cells (WBCs), and platelets. In some embodiments, the biological sample includes at least 10 cells. In some embodiments, the biological sample includes at least 25 cells, at least 50 cells, at least 100 cells, at least 250 cells, at least 500 cells, at least 1000 cells, at least 2500 cells, at least 5000 cells, at least 10,000 cells, at least 25,000 cells, at least 50,000 cells, at least 100,000 cells, or more.

The method includes receiving, at a plurality of receivers arranged in a spatial pattern (e.g., one or more pixel array detectors, e.g., a charge coupled device (CCD), of imaging camera 160), responses to the first wavelength of EM radiation after the first wavelength of EM radiation interacts with the biological sample. In some embodiments, the one or more detectors collectively include at least 500 pixels. In some embodiments, the one or more detectors collectively include at least 1000 pixels, at least 2500 pixels, at least 5000 pixels, at least 10,000 pixels, at least 25,000 pixels, at least 50,000 pixels, at least 100,000 pixels, at least 250,000 pixels, at least 500,000 pixels, at least 1,000,000 pixels, at least 2,500,000 pixels, at least 5,000,000 pixels, or more pixels.

The method also includes emitting a second wavelength of EM radiation towards the biological sample, and receiving, at the plurality of receivers, responses to the second wavelength of EM radiation after the second wavelength of EM radiation interacts with the biological sample.

In some embodiments, a respective wavelength of EM radiation used to collect an image of the imaging chamber is configured for detection of a nucleic acid stain applied to the cells, e.g., to mark the nucleus and/or cytoplasm of cells in the imaging field. Non-limiting examples of nucleic acid stains include acredine orange, astrozon orange, and syto.

In some embodiments, a respective wavelength of EM radiation used to collect an image of the imaging chamber is configured for detection of an immuno-stain directed against a cell-surface antigen. Non-limiting examples of cell-surface antigens that can be used to differentiate between different types of blood cells include CD45, CD14, and CD123. However, any cell-surface antigen can be detected using the methods and systems described herein. In fact, hundreds of cell-surface antigens, which can be used to distinguish different cell types are known in the art. For instance, an example list of cell-surface antigens can be found online at the URL abcam.com/primary-antibodies/human-cd-antigen-guide.

In some embodiments, additional images are collected at different wavelengths of EM radiation, e.g., by emitting different wavelengths of light towards the biological sample and receiving responses to the different wavelengths of light. In some embodiments, at least three images are collected different wavelengths of light. In some embodiments, at least four, at least five, at least six, at least seven, at least eight, at least nine, at least ten, or more images are collected different wavelengths of light.

Accordingly, in some embodiments, the method further includes emitting a third wavelength of EM radiation towards the biological sample, and receiving, at the plurality of receivers, responses to the third wavelength of EM radiation after the third wavelength of EM radiation interacts with the biological sample. In some embodiments, the method further includes emitting a fourth wavelength of EM radiation towards the biological sample, and receiving, at the plurality of receivers, responses to the fourth wavelength of EM radiation after the third wavelength of EM radiation interacts with the biological sample. In some embodiments, the method further includes emitting a fifth wavelength of EM radiation towards the biological sample, and receiving, at the plurality of receivers, responses to the fifth wavelength of EM radiation after the fifth wavelength of EM radiation interacts with the biological sample.

The method then includes performing processing on first signals representative of the received responses to the first wavelength of EM radiation and second signals representative of the received responses to the second wavelength of EM radiation. In some embodiments, where additional images are collected at different wavelengths of light, the processing is performed on signals from at least three, at least four, at least five, at least six, at least seven, at least eight, at least nine, at least ten, or more images are collected different wavelengths of light. In some embodiments, the processing includes replicating and mixing the first signals and the second signals, and any additional signals from images collected at other wavelengths of light, to generate a set of spectro-spatial responses.

In some embodiments, the set of spectro-spatial responses provides a count of one or more of red blood cells, platelets, and white blood cells for the biological sample. In some embodiments, the set of spectro-spatial responses provides a count of red blood cells, platelets, and white blood cells for the biological sample. In some embodiments, the set of spectro-spatial responses provides a differential white blood cell count, e.g., counts of one or more of neutrophils, lymphocytes, monocytes, eosinophils, and basophils for the biological sample.

In some embodiments, for a respective biological sample (e.g., a blood sample) a series of fields of views (FOVs) are collected. At each FOV, a series of images is captured at different wavelengths corresponding to cell stains and dyes (e.g., nucleic acid, organelle, or other cell structure or sub-structure stains and/or labels that bind to cell-surface markers). In some embodiments, this includes fluorescent images with laser light excitation as well as scattering image with a partially coherent light. The fluorescent images are taken at wavelength bands corresponding to the emission wavelength of the dyes. From each FOV, a series of size, morphological, fluorescent and/or scattering information is extracted. In some embodiments, cell size and/or other morphological information (e.g., such as size, eccentricity, major/minor axis, fluorescent and scattering intensities, etc.) is extracted for each cell. In some embodiments, various wavelength responses are also extracted from the images. These features are mixed and matched to extract each cell's parameters. For instance, Lymphocytes have a certain size, they are low on fluorescence in Acredine and low on the scattering signal while Neutrophils are high on both and monocytes are in the middle. In some embodiments, the cell's parameters are determined by evaluating the cellular features with a model, e.g., a machine learning model.

Accordingly, in one embodiment, the disclosure provides a method for analyzing a mixture of cells, e.g., blood. The method includes obtaining a first plurality of pixelated images of a first imaging chamber holding a first plurality of cells (e.g., blood cells) from a biological sample, wherein each respective pixelated image in the first plurality of pixelated images is collected at a different wavelength of electromagnetic (EM) radiation in a first plurality of wavelengths of EM radiation. In some embodiments, the plurality of pixelated images of the first imaging chamber includes at least 3 images collected at different wavelengths of EM radiation. In some embodiments, the plurality of pixelated images of the first imaging chamber includes at least 4, at least 5, at least 6, at least 7, at least 8, at least 9, at least 10, or more images collected at different wavelengths of EM radiation.

The method then includes identifying, for each respective blood cell in the first plurality of blood cells, a corresponding set of pixels in each respective pixelated image in the first plurality of pixelated images corresponding to the respective blood cell. That is, identifying which pixels in each image correspond to each respective cell. In some embodiments, sets of pixels for each respective cell type collectively include at least 100 pixels. In some embodiments, sets of pixels for each respective cell type collectively include at least 250, at least 500, at least 1000, at least 2500, at least 5000, at least 10,000, at least 25,000, at least 50,000, at least 100,000, at least 250,000, at least 500,000, at least 1,000,000, or more pixels.

The method then includes determining, for each respective blood cell in the first plurality of blood cells, a corresponding imaging feature of the respective blood cell from each respective pixelated image in the first plurality of pixelated images based on pixel values for the corresponding set of pixels corresponding to the respective blood cell in the respective pixelated image, thereby obtaining a corresponding set of imaging features for each respective blood cell in the first plurality of blood cells. Each corresponding set of imaging features for each respective blood cell in the first plurality of blood cells, are then evaluated using a first model for identifying a type of the respective blood cell. In some embodiments, the first model determines an aggregate count of each blood cell type present in the first plurality of blood cells.

In some embodiments, the first model distinguishes between red blood cells and platelets. In some embodiments, the first model distinguishes between red blood cells, white blood cells, and platelets. In some embodiments, the first model is a machine learning model, e.g., as described herein.

In some embodiments, the method also includes capturing and analyzing images of a second imaging chamber containing cells from the biological sample. In some embodiments, RBC, platelet, and WBC counts are determined from a first series of images, e.g., of a first imaging chamber, and WBC differentials are determined from a second series of images, e.g., of a second imaging chamber.

Accordingly, in some embodiments, the method also includes obtaining a second plurality of pixelated images of a second imaging chamber holding a second plurality of blood cells from the biological sample, wherein each respective pixelated image in the second plurality of pixelated images is collected at a different wavelength of electromagnetic (EM) radiation in a second plurality of wavelengths of EM radiation. In some embodiments, the first imaging chamber is the second imaging chamber, e.g., but the chamber holds different portions of a biological sample when performing the first and second imaging. In some embodiments, the plurality of pixelated images of the second imaging chamber includes at least 3 images collected at different wavelengths of EM radiation. In some embodiments, the plurality of pixelated images of the second imaging chamber includes at least 4, at least 5, at least 6, at least 7, at least 8, at least 9, at least 10, or more images collected at different wavelengths of EM radiation.

In some embodiments, the method includes identifying, for each respective blood cell in the second plurality of blood cells, a corresponding set of pixels in each respective pixelated image in the second plurality of pixelated images corresponding to the respective blood cell. In some embodiments, sets of pixels for each respective cell type collectively include at least 100 pixels. In some embodiments, sets of pixels for each respective cell type collectively include at least 250, at least 500, at least 1000, at least 2500, at least 5000, at least 10,000, at least 25,000, at least 50,000, at least 100,000, at least 250,000, at least 500,000, at least 1,000,000, or more pixels.

In some embodiments, the method than includes determining, for each respective blood cell in the second plurality of blood cells, a corresponding imaging feature of the respective blood cell from each respective pixelated image in the second plurality of pixelated images based on pixel values for the corresponding set of pixels corresponding to the respective blood cell in the respective pixelated image, thereby obtaining a corresponding set of imaging features for each respective blood cell in the second plurality of blood cells. Each corresponding set of imaging features for each respective blood cell in the second plurality of blood cells, is evaluated using a second model for identifying a type of the respective blood cell, thereby determining an aggregate count of each blood cell type present in the second plurality of blood cells.

In some embodiments, the second model distinguishes between different types of white blood cells. In some embodiments, the second model distinguishes between neutrophils, lymphocytes, monocytes, eosinophils, and basophils. In some embodiments, the second model is a machine learning model, e.g., as described herein.

Machine Learning

In some embodiments, the methods and systems described herein use machine learning to count, size and/or speciate one or more cells in the sample. In some embodiments, the machine learning method described herein is a logistic regression algorithm, a neural network algorithm, a convolutional neural network algorithm, a support vector machine (SVM) algorithm, a Naive Bayes algorithm, a nearest neighbor algorithm, a boosted trees algorithm, a random forest algorithm, a decision tree algorithm, a clustering algorithm, or a combination thereof. In some embodiments, the machine learning includes use of a neural network algorithm, e.g., a convolutional neural network algorithm.

In some embodiments, a deep learning model, is used in the methods and systems described herein, e.g., to differentiate between different types of cells imaged in a field. Deep learning models use multiple layers to extract higher-level features from input data.

Neural networks. In some embodiments, the deep learning model is a neural network (e.g., a convolutional neural network and/or a residual neural network). Neural network algorithms, also known as artificial neural networks (ANNs), include convolutional and/or residual neural network algorithms (deep learning algorithms). Neural networks can be machine learning algorithms that may be trained to map an input data set to an output data set, where the neural network comprises an interconnected group of nodes organized into multiple layers of nodes. For example, the neural network architecture may comprise at least an input layer, one or more hidden layers, and an output layer. The neural network may comprise any total number of layers, and any number of hidden layers, where the hidden layers function as trainable feature extractors that allow mapping of a set of input data to an output value or set of output values. As used herein, a deep learning algorithm (DNN) can be a neural network comprising a plurality of hidden layers, e.g., two or more hidden layers. Each layer of the neural network can comprise a number of nodes (or "neurons"). A node can receive input that comes either directly from the input data or the output of nodes in previous layers, and perform a specific operation, e.g., a summation operation. In some embodiments, a connection from an input to a node is associated with a parameter (e.g., a weight and/or weighting factor). In some embodiments, the node may sum up the products of all pairs of inputs, xi, and their associated parameters. In some embodiments, the weighted sum is offset with a bias, b. In some embodiments, the output of a node or neuron may be gated using a threshold or activation function, f, which may be a linear or non-linear function. The activation function may be, for example, a rectified linear unit (ReLU) activation function, a Leaky ReLU activation function, or other function such as a saturating hyperbolic tangent, identity, binary step, logistic, arcTan, softsign, parametric rectified linear unit, exponential linear unit, softPlus, bent identity, softExponential, Sinusoid, Sine, Gaussian, or sigmoid function, or any combination thereof.

The weighting factors, bias values, and threshold values, or other computational parameters of the neural network, may be "taught" or "learned" in a training phase using one or more sets of training data. For example, the parameters may be trained using the input data from a training data set and a gradient descent or backward propagation method so that the output value(s) that the ANN computes are consistent with the examples included in the training data set. The parameters may be obtained from a back propagation neural network training process.

Any of a variety of neural networks may be suitable for use in analyzing different cell types, e.g., for differentiating between different types of blood cells. Examples can include, but are not limited to, feedforward neural networks, radial basis function networks, recurrent neural networks, residual neural networks, convolutional neural networks, residual convolutional neural networks, and the like, or any combination thereof. In some embodiments, the machine learning makes use of a pre-trained and/or transfer-learned ANN or deep learning architecture. Convolutional and/or residual neural networks can be used for analyzing cell types in a sample.

For instance, a deep neural network model comprises an input layer, a plurality of individually parameterized (e.g., weighted) convolutional layers, and an output scorer. The parameters (e.g., weights) of each of the convolutional layers as well as the input layer contribute to the plurality of parameters (e.g., weights) associated with the deep neural network model. In some embodiments, at least 100 parameters, at least 1000 parameters, at least 2000 parameters, at least 5000 parameters, at least 10,000 parameters, at least 25,000 parameters, at least 50,000 parameters, at least 100,000 parameters, at least 250,000 parameters, at least 500,000 parameters, or more parameters are associated with the deep neural network model. As such, deep neural network models require a computer to be used because they cannot be mentally solved. In other words, given an input to the model, the model output needs to be determined using a computer rather than mentally in such embodiments. See, for example, Krizhevsky et al., 2012, "Imagenet classification with deep convolutional neural networks," in Advances in Neural Information Processing Systems 2, Pereira, Burges, Bottou, Weinberger, eds., pp. 1097-1105, Curran Associates, Inc.; Zeiler, 2012 "ADADELTA: an adaptive learning rate method," CoRR, vol. abs/1212.5701; and Rumelhart et al., 1988, "Neurocomputing: Foundations of research," ch. Learning Representations by Back-propagating Errors, pp. 696-699, Cambridge, MA, USA: MIT Press, each of which is hereby incorporated by reference.

Neural network algorithms, including convolutional neural network algorithms, suitable for use as models are disclosed in, for example, Vincent et al., 2010, "Stacked denoising autoencoders: Learning useful representations in a deep network with a local denoising criterion," J Mach Learn Res 11, pp. 3371-3408; Larochelle et al., 2009, "Exploring strategies for training deep neural networks," J Mach Learn Res 10, pp. 1-40; and Hassoun, 1995, Fundamentals of Artificial Neural Networks, Massachusetts Institute of Technology, each of which is hereby incorporated by reference. Additional example neural networks suitable for use in the methods and systems described herein are disclosed in Duda et al., 2001, Pattern Classification, Second Edition, John Wiley & Sons, Inc., New York; and Hastie et al., 2001, The Elements of Statistical Learning, Springer-Verlag, New York, each of which is hereby incorporated by reference in its entirety. Additional example neural networks suitable for use as models are also described in Draghici, 2003, Data Analysis Tools for DNA Microarrays, Chapman & Hall/CRC; and Mount, 2001, Bioinformatics: sequence and genome analysis, Cold Spring Harbor Laboratory Press, Cold Spring Harbor, New York, each of which is hereby incorporated by reference in its entirety.

Logistic regression algorithms suitable for use in the methods and systems described herein are disclosed, for example, in Agresti, *An Introduction to Categorical Data Analysis*, 1996, Chapter 5, pp. 103-144, John Wiley & Son, New York, which is hereby incorporated by reference. SVM algorithms suitable for use in the methods and systems described herein are disclosed, for example, in Cristianini and Shawe-Taylor, 2000, "An Introduction to Support Vector Machines," Cambridge University Press, Cambridge; Boser et al., 1992, "A training algorithm for optimal margin classifiers," in Proceedings of the 5th Annual ACM Workshop on Computational Learning Theory, ACM Press, Pittsburgh, Pa., pp. 142-152; Vapnik, 1998, *Statistical Learning Theory*, Wiley, New York; Mount, 2001, *Bioinformatics: sequence and genome analysis*, Cold Spring Harbor Laboratory Press, Cold Spring Harbor, N.Y.; Duda, *Pattern Classification*, Second Edition, 2001, John Wiley & Sons, Inc., pp. 259, 262-265; and Hastie, 2001, *The Elements of Statistical Learning*, Springer, New York; and Furey et al., 2000, *Bioinformatics* 16, 906-914, each of which is hereby incorporated by reference in its entirety. When used for classification, SVMs separate a given set of binary labeled data training set (e.g., first, second, and/or third cell type identities) with a hyperplane that is maximally distant from the labeled data. For cases in which no linear separation is possible, SVMs can work in combination with the technique of 'kernels,' which automatically realize a non-linear mapping to a feature space. The hyperplane found by the SVM in feature space corresponds to a non-linear decision boundary in the input space.

Naïve Bayes classifiers suitable for use in the methods and systems described herein are disclosed, for example, in Ng et al., 2002, "On discriminative vs. generative classifiers: A comparison of logistic regression and naive Bayes," Advances in Neural Information Processing Systems, 14, which is hereby incorporated by reference.

Decision trees algorithms suitable for use in the methods and systems described herein are described in, for example, Duda, 2001, *Pattern Classification*, John Wiley & Sons, Inc., New York, pp. 395-396, which is hereby incorporated by reference. Tree-based methods partition the feature space into a set of rectangles, and then fit a model (like a constant) in each one. In some embodiments, the decision tree is random forest regression. One specific algorithm that can be used as a classifier is a classification and regression tree (CART). Other examples of specific decision tree algorithms that can be used as classifiers include, but are not limited to, ID3, C4.5, MART, and Random Forests. CART, ID3, and C4.5 are described in Duda, 2001, *Pattern Classification*, John Wiley & Sons, Inc., New York. pp. 396-408 and pp. 411-412, which is hereby incorporated by reference. CART, MART, and C4.5 are described in Hastie et al., 2001, *The Elements of Statistical Learning*, Springer-Verlag, New York, Chapter 9, which is hereby incorporated by reference in its entirety. Random Forests are described in Breiman, 1999, "Random Forests—Random Features," Technical Report 567, Statistics Department, U. C. Berkeley, September 1999, which is hereby incorporated by reference in its entirety.

Clustering algorithms suitable for use in the methods and systems described herein are described, for example, at pages 211-256 of Duda and Hart, *Pattern Classification and Scene Analysis,* 1973, John Wiley & Sons, Inc., New York, (hereinafter "Duda 1973") which is hereby incorporated by reference in its entirety. As set forth in Section 6.7 of Duda 1973, the clustering problem is described as one of finding natural groupings in a dataset. To identify natural groupings, two issues are addressed. First, a way to measure similarity (or dissimilarity) between two samples is determined. This metric (similarity measure) is used to ensure that the samples in one cluster are more like one another than they are to samples in other clusters. Second, a mechanism for partitioning the data into clusters using the similarity measure is determined. Similarity measures are discussed in Section 6.7 of Duda 1973, where it is stated that one way to begin a clustering investigation is to define a distance function and to compute the matrix of distances between all pairs of samples in a dataset. If distance is a good measure of similarity, then the distance between samples in the same cluster will be significantly less than the distance between samples in different clusters. However, as stated on page 215 of Duda 1973, clustering does not require the use of a distance metric. For example, a nonmetric similarity function s (x, x') can be used to compare two vectors x and x'. Conventionally, s (x, x') is a symmetric function whose value is large when x and x' are somehow "similar." An example of a nonmetric similarity function s (x, x') is provided on page 216 of Duda 1973.

Moreover, as used herein, the term "parameter" refers to any coefficient or, similarly, any value of an internal or external element (e.g., a weight and/or a hyperparameter) in an algorithm and/or model that can affect (e.g., modify, tailor, and/or adjust) one or more inputs, outputs, and/or functions in the algorithm and/or model. For example, in some embodiments, a parameter refers to any coefficient, weight, and/or hyperparameter that can be used to control, modify, tailor, and/or adjust the behavior, learning and/or performance of an algorithm and/or model. In some instances, a parameter is used to increase or decrease the influence of an input (e.g., a feature) to an algorithm and/or model. As a nonlimiting example, in some instances, a parameter is used to increase or decrease the influence of a node (e.g., of a neural network), where the node includes one or more activation functions. Assignment of parameters to specific inputs, outputs, and/or functions is not limited to any one paradigm for a given algorithm and/or model but can be used in any suitable an algorithm and/or model architecture for a desired performance. In some embodiments, a parameter has a fixed value. In some embodiments, a value of a parameter is manually and/or automatically adjustable. In some embodiments, a value of a parameter is modified by a validation and/or training process for an algorithm and/or model (e.g., by error minimization and/or backpropagation methods, as described elsewhere herein).

In some embodiments, an algorithm and/or model of the present disclosure includes at least 5, at least 10, at least 25, at least 50, at least 100, at least 250, at least 500, at least 1000, at least 2500, at least 5000, at least 10,000, at least 25,000, at least 50,000, at least 100,000, at least 250,000, at least 500,000, at least 1,000,000, or more parameters. In some embodiments, an algorithm and/or model of the present disclosure includes from 100 to 1,000,000 parameters, from 500 to 1,000,000 parameters, from 1000 to 1,000,000 parameters, from 2500 to 1,000,000 parameters, from 5000 to 1,000,000 parameters, from 10,000 to 1,000,000 parameters, from 25,000 to 1,000,000 parameters, from 100 to 500,000 parameters, from 500 to 500,000 parameters, from 1000 to 500,000 parameters, from 2500 to 500,000 parameters, from 5000 to 500,000 parameters, from 10,000 to 500,000 parameters, from 25,000 to 500,000 parameters, from 100 to 250,000 parameters, from 500 to 250,000 parameters, from 1000 to 250,000 parameters, from 2500 to 250,000 parameters, from 5000 to 250,000 parameters, from 10,000 to 250,000 parameters, from 25,000 to 250,000 parameters, from 100 to 100,000 parameters, from 500 to 100,000 parameters, from 1000 to 100,000 parameters, from 2500 to 100,000 parameters, from 5000 to 100,000 parameters, from 10,000 to 100,000 parameters, or from 25,000 to 100,000 parameters.

Flow Cell

In certain embodiments, a flow cell can include two separate analysis chambers for RBC/Platelets and WBC samples. The dimensions of the imaging area can differ for the two sample lineages (e.g., based on the size of the analyte being imaged). For example, an RBC/Platelet sample can go into a shallow channel & a WBC sample can go into a deeper channel. The flow cell can be constructed from optically transparent plastic and channel depths can be controlled using spacing layers or injection molds. The channels and surfaces can be coated with appropriate reagents to ensure proper sample flow through the channel during loading. Once loaded, the cells settle at the bottom of the flow cell where the focal length of the microscopy system resides. At that location, the system performs the capture and analysis routines.

Accordingly, in some embodiments, the disclosure provides a cartridge for containing a sample for analysis, e.g., cells of different types, e.g., different types of blood cells. In some embodiments, the cartridge includes a sample chamber for receiving a sample that includes a first cell type and a second cell type, e.g., two or more of red blood cells, white blood cells, and platelets. The cartridge also includes a first analysis chamber, e.g., an imaging chamber, fluidically coupled to the sample chamber by a first conduit, where the cartridge is configured to permit passage of the first blood cell type, but not the second blood cell type, from the sample chamber to the first imaging chamber. For example, in some embodiments, a first blood cell type, e.g., red blood cells, are excluded from the first analysis chamber by physio-chemical depletion process. Likewise, in some embodiments, a cross-sectional area of the first conduit is sufficient to permit passage of a first analyte (e.g., a first blood cell type), but not a second analyte (e.g., a second blood cell type), from the sample chamber to the first analysis chamber. The cartridge also includes a second analysis chamber, e.g., a second imaging chamber, fluidically coupled to the sample chamber by a second conduit. In some embodiments, a depth of the first conduit and/or the second conduit is governed by a spacer. The cartridge is optically transparent from at least one side, to permit imaging of cells when present in the cartridge.

Digital Inverted Microscope

In certain embodiments, the sample can be analyzed with a hybrid inverted digital microscope that images the flow cell at various spectral channels with coherent and partially coherent illumination sources. The inverted setup helps with letting the cells settle at the bottom of the flow cell and images the cell at a focal plane where the cells settle and appear to present the sharpest image. Once the focus height is determined, fluorescent images can be taken. The combination of fluorescent images are stacked and compared against each other to enumerate the cells and classify them based on their respective sizes, morphology, and spectral response signatures.

In certain embodiments, the sample can be illuminated using 3 coherent laser sources at 405, 520, and 638 nm wavelengths and one partially coherent source at 635 nm in a set sequence. At each step, a respective image can be taken with the optimized parameters, and radiometric measurements are performed to enumerate cells and speciate them based on their respective elastic or non-elastic optical responses. The light sources, image capture parameters and radiometric measurements are done in a calibrated manner through which one can perform quantitative analysis of the responses and sub-speciate the cells.

FIG. 1 illustrates one exemplary embodiment of the functional components of the digital microscope and their respective interactions. The sample is first loaded into the flow cells. Then, using motorized stages, the sample can be transported to the analysis area where the illumination unit and the optical assembly are located. At the set field of view (FOV), a series of images can be taken in a set sequence with a set of predetermined parameters for illuminations and emissions.

This set of multidimensional data can be analyzed to enumerate and extract the number of cells and their types through a series of spatiotemporal analyses.

In certain embodiments, the system is configured to classify cell-types based on inelastic scattering signals over a two-dimensional spatial distribution. Traditional flow cytometers use similar properties to identify and speciate different types of cells through a one-dimensional flow path. Scattering parameters can be used for the identification of cells with varying complexity. For example, granulocytes are characterized by the high volume of cytoplasmic granules. The light reflecting off of the granules increases the intensity of the backscatter measurement and allows for discernment between granulocytes and monocytes.

Certain embodiments of the present disclosure utilize models from Radar backscattering principles to evaluate the surface roughness of various WBCs as perceived optically at the illuminating wavelength. The backscatter intensity can be written as:

$$I_{set} = \int_{\Delta\Omega_d} Q_{set}\sigma(\theta)d\Omega$$

where:
$I_{sct}$ is backscatter intensity
$Q_{sct}$ probability density function of the scattering event
$\sigma(\theta)$ is the scattering cross section at incident angle $\theta$
$\Delta\Omega_d$ is the sold angle of the detector Based on the Rayleigh criterion, features greater than 130 nm, which is sufficient to identify granules within white blood cells, can be measured. The sample cells are illuminated using a series of pencil beams at various wavelengths. Certain embodiments of the present disclosure comprise three coherent sources at 405 nm, 520 nm, and 638 nm and a partially coherent source at 635 nm for backscatter evaluation. The backscatter source can be chosen to be partially coherent to reduce the effects of speckle-noise but can be a coherent source as well. Such a setting would allow for the enumeration and classification of cells based on their surface markers and their surface roughness as opposed to pure morphological assessments. Therefore, in certain embodiments of the present disclosure, a digital microscope is able to operate at magnification values of 10× or lower allowing for a larger area of analysis per field of view.

Figure 2:
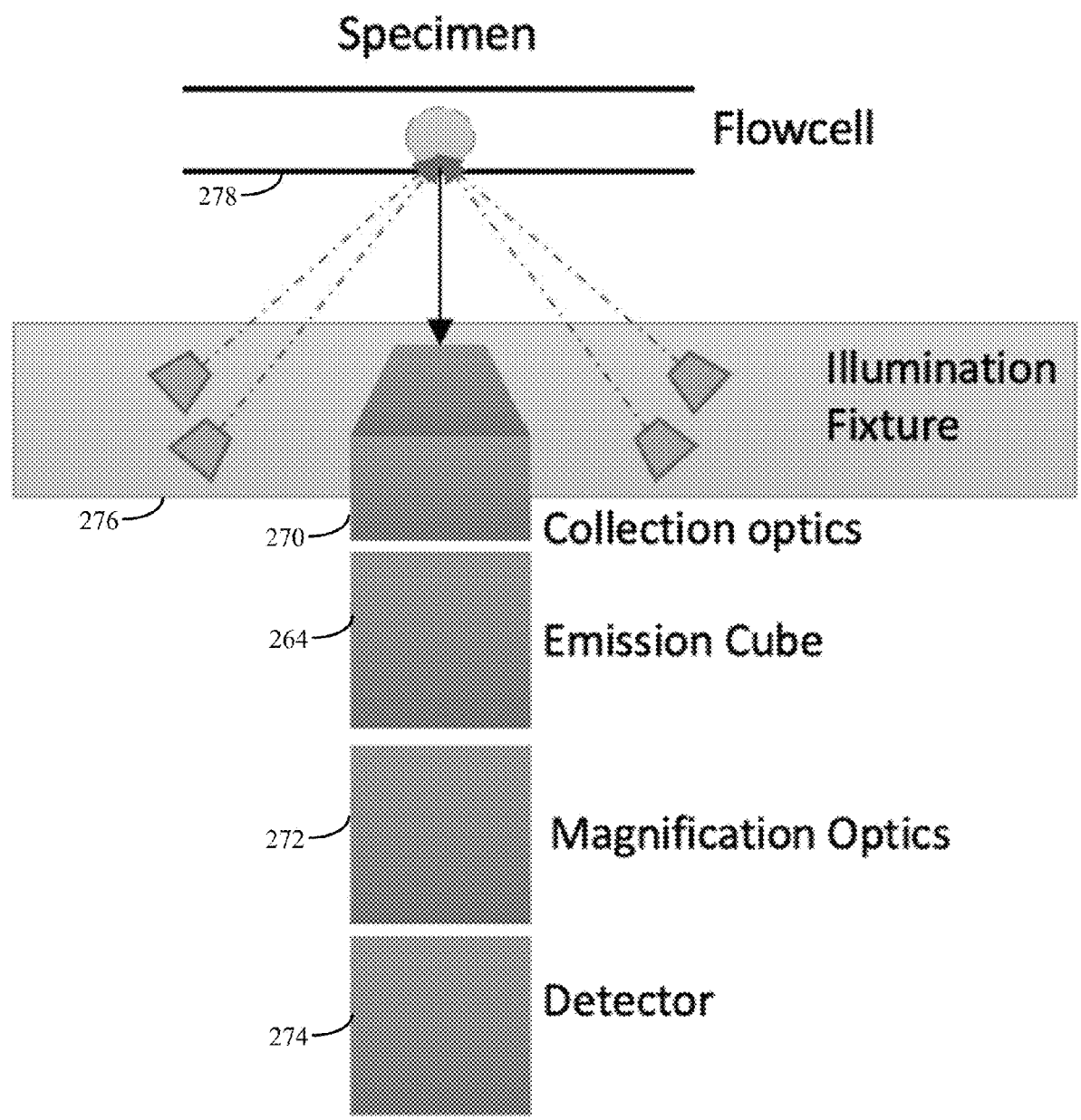
FIG. 2 illustrates a general schematic of a digital microscopy system, in accordance with various embodiments of the present disclosure.

FIG. 2 illustrates a general schematic of the proposed digital microscopy system. The inverted setup can be used to focus on the monolayer of the cells at the bottom of the flow cell. The illumination system can be used to provide the multitude of the spectro-temporal information necessary to enumerate and classify different cell types. In certain embodiments, the optical system and the illumination system are disposed on the same side of the sample. In other embodiments, the optical system and the illumination system are disposed on opposing sides of the sample. In certain embodiments, a series of mixers/unmixers can be utilized to develop a methodology that extracts and sub-speciates cell types. This method, can comprise one or more of: emitting a first wavelength of electromagnetic (EM) radiation towards a biological sample; receiving, at a plurality of receivers arranged in a spatial pattern, responses to the first wavelength of EM radiation after the first wavelength of EM radiation interacts with the biological sample; emitting a second wavelength of EM radiation towards the biological sample; receiving, at the plurality of receivers, responses to the second wavelength of EM radiation after the second wavelength of EM radiation interacts with the biological sample; performing processing on first signals representative of the received responses to the first wavelength of EM radiation and second signals representative of the received responses to the second wavelength of EM radiation, the processing including: replicating and mixing the first signals and the second signals to generate a set of spectro-spatial responses.

Figure 3:
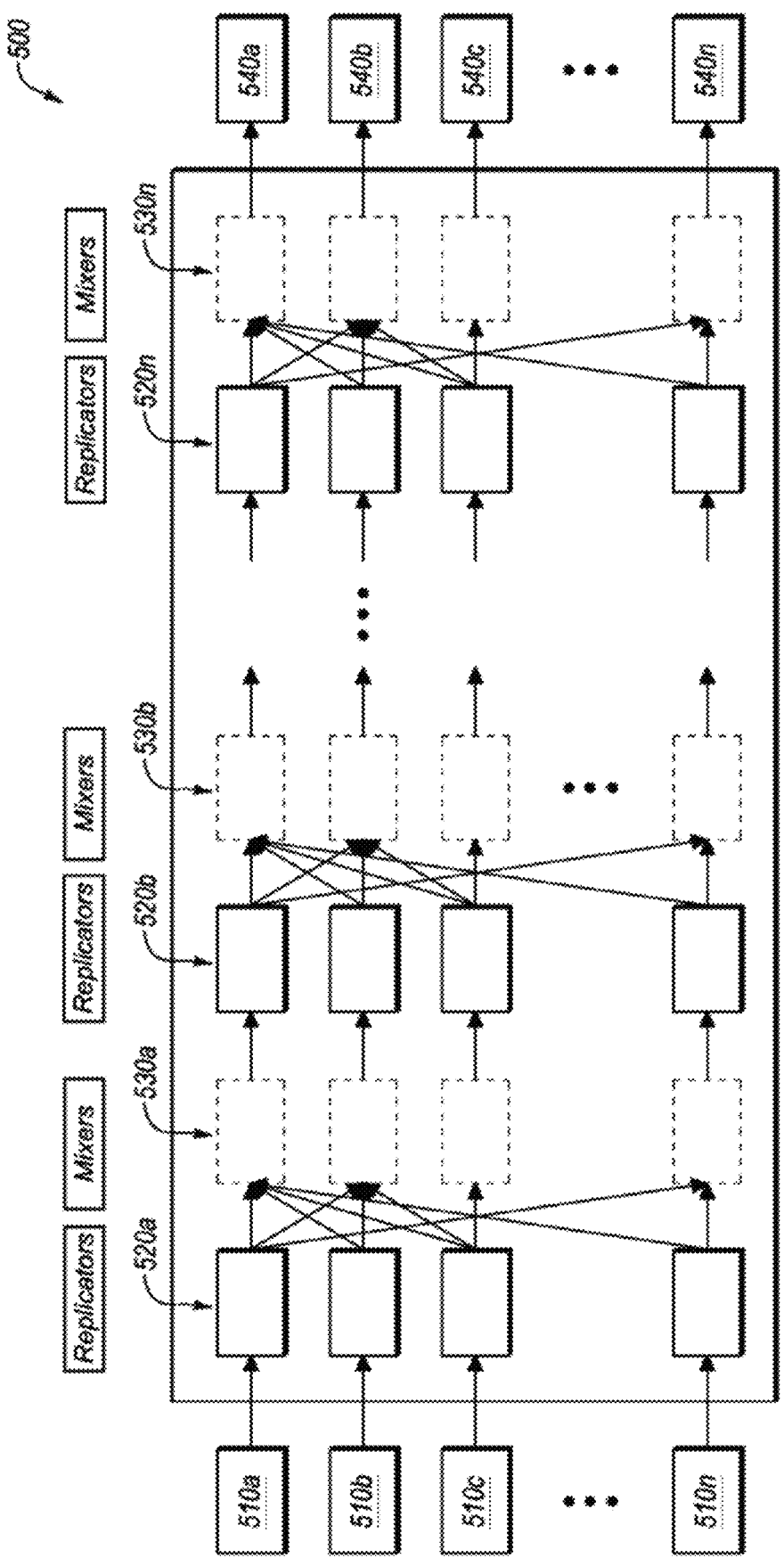
FIG. 3 illustrates an example of a first portion of a signal mixer device, in accordance with one or more embodiments of the present disclosure.
Figure 5:
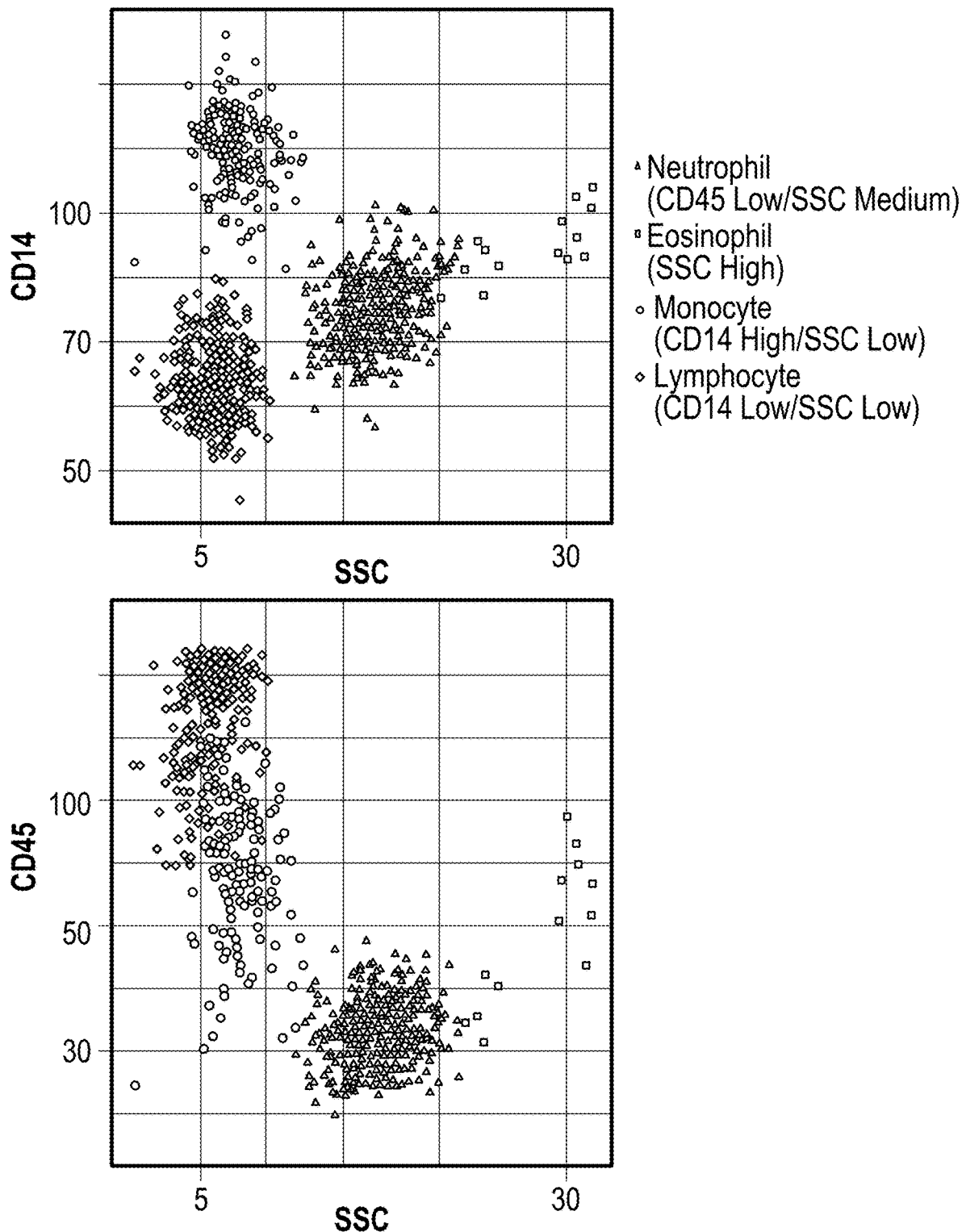
FIG. 5 illustrates scatter plots from the multidimensional dataset across a large population set.

FIG. 3 illustrates an exemplary mixer/unmixer system. FIG. 3 illustrates an example of a first portion 500 of a signal mixer device, in accordance with one or more embodiments of the present disclosure. As illustrated in FIG. 5, the first portion 500 may receive as input one or more of the received signals 510 (e.g., received signals 510 *a*, 510 *b*, . . . , 510 *n*) as detected by the receivers and/or as emitted by the emitters and interacting with the target. The first portion 500 includes a first set of replicators 520 *a* that replicate the input signals a number of times and pass those signals to one or more mixer units 530 *a*. The output of the mixer units 530 *a* may be used as the input signal for the next cascade of replicators 520 *b*. The output of the replicators 530 *b* may be used as the inputs for the mixer units 530 *b*. While three iterations of the cascade of replicators 520 and mixers 530 are illustrated, any number of iterations of replicators 520 and mixers 530 (e.g., up to the replicators 520 *n* and mixers 530 *n*) are contemplated within the present disclosure.

After the cascade of replicators 520 and mixers 530, the first portion 500 may output a series of spectro-spatial responses 540 *a-n*. In some embodiments, the number of spectro-spatial responses 540 may be based on the number of frequency bands emitted, the number of frequency bands selected for by the receivers, the number of distinct spatial signals received, the number of receivers, the number of emitters, the combination set of emitters emitting at a subset of bands at the same time, etc. The spectro-spatial information can be then utilized within the system to sub-speciate cells based on their multidimensional responses across spectral channels and spatial inclusion/exclusion criteria.

EXAMPLES

Sample Analysis

Figure 4A:
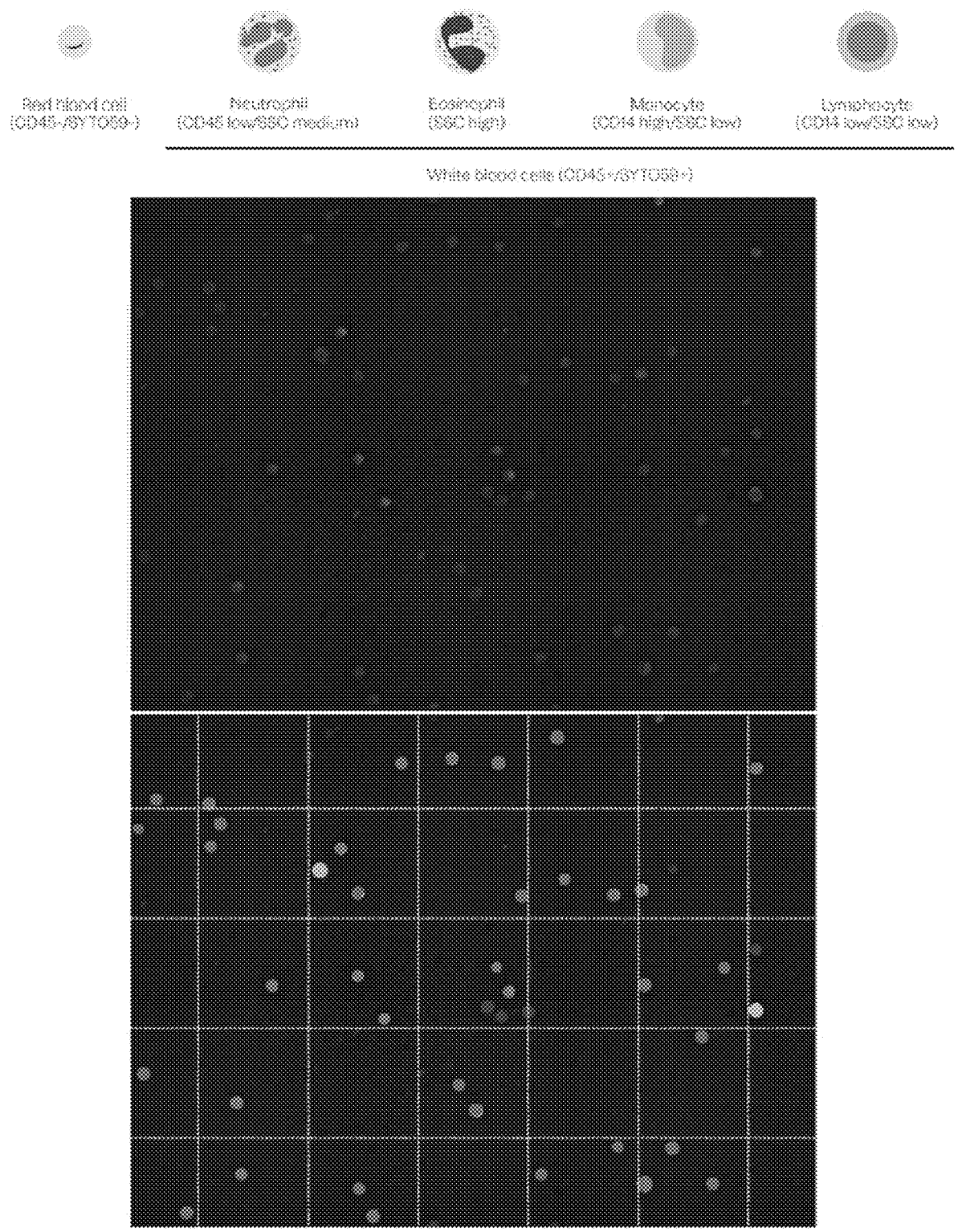
FIGS. 4A and 4B collectively illustrate how a multi-dimensional data set enables automated identification of cell populations.
Figure 4B:
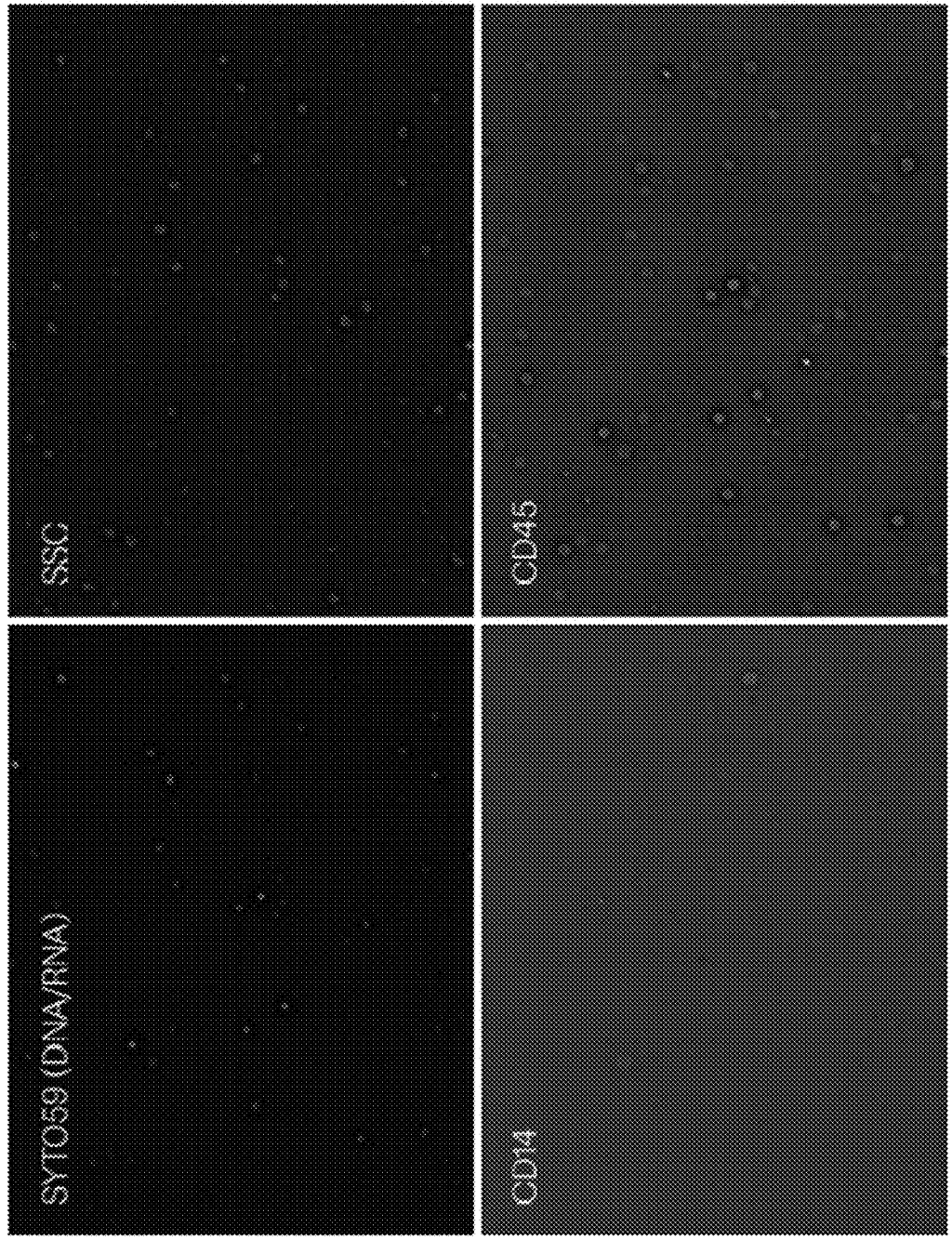

FIG. 4 illustrates how a multi-dimensional data set enables automated identification of cell populations. Certain embodiments of the present disclosure comprise a ring-shaped illumination system designed to enumerate and sub-speciate blood cells with nine lasers and six LEDs. The lasers and/or LEDs are perfectly aligned to illuminate a single common area of the sample flow cell. The end result can be a series of stackable images that can be used to assess spectral signatures, morphology, cell size, cell count, and side scatter for CBC analysis.

FIG. 5 illustrates scatter plots from the multidimensional dataset across a large population set. Certain embodiments of the present disclosure differentiate between RBCs, platelets, lymphocytes, monocytes, basophils, eosinophils, and neutrophils using supervised machine learning methods based on a multi-dimensional data set. The captured dataset around the cell types and their populations are translated to a scatter plot format typical of flow cytometry results.

Figure 6A:
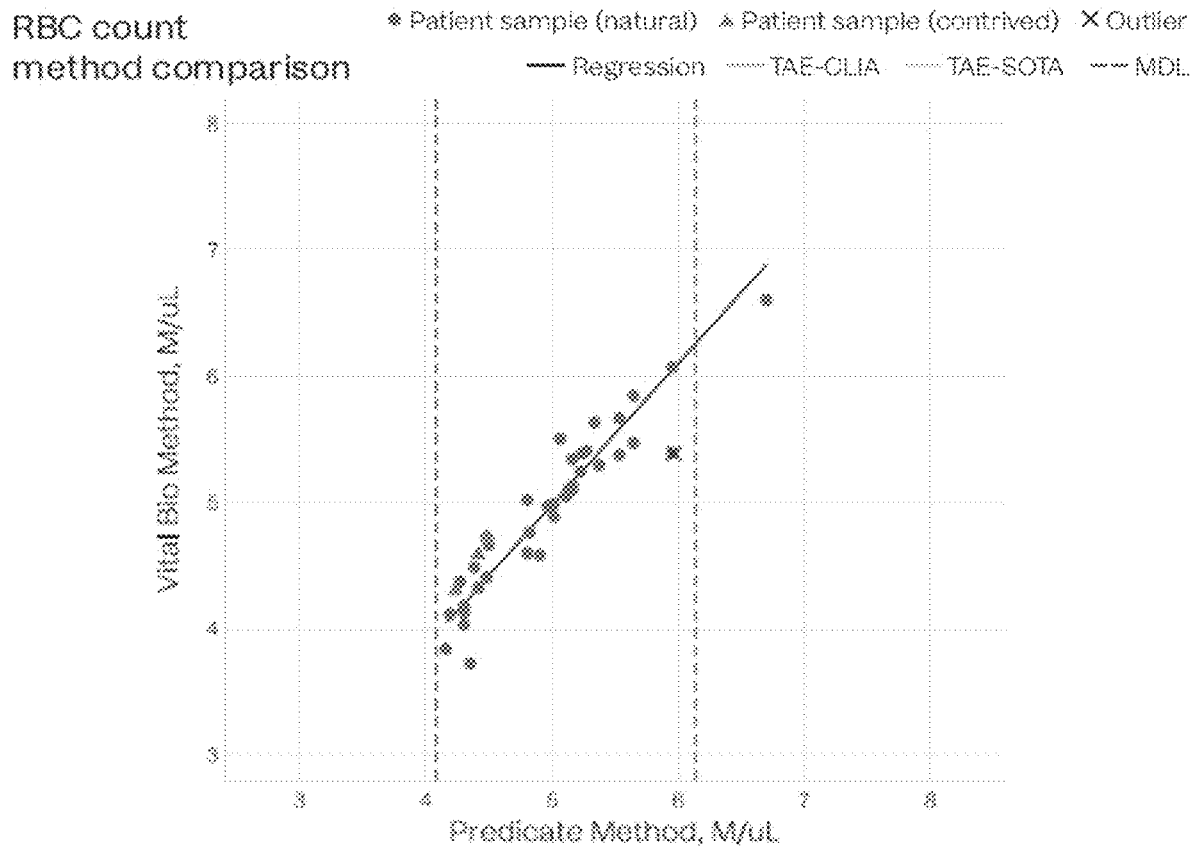
FIGS. 6A and 6B illustrate a comparison of red blood cell count measured by a device of the present disclosure and a Beckman Coulter DxH 500.
Figure 6B:
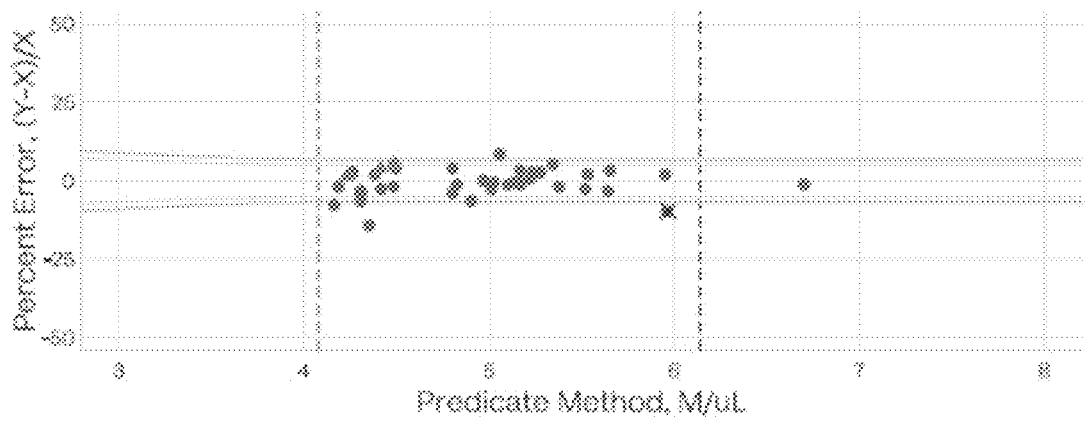

FIG. 6A-B illustrate a comparison of red blood cell count measured by a device of the present disclosure and a Beckman Coulter DxH 500. (A) A method comparison plot with the predicate device on the x-axis. Overlaid on the data are a weighted linear regression and any relevant medical decision levels (MDLs). (B) A Bland-Altman diagram with the Total Allowable Error (TAE) limits as defined by CLIA and the state of the art (SOTA). n=40.

Figure 7A:
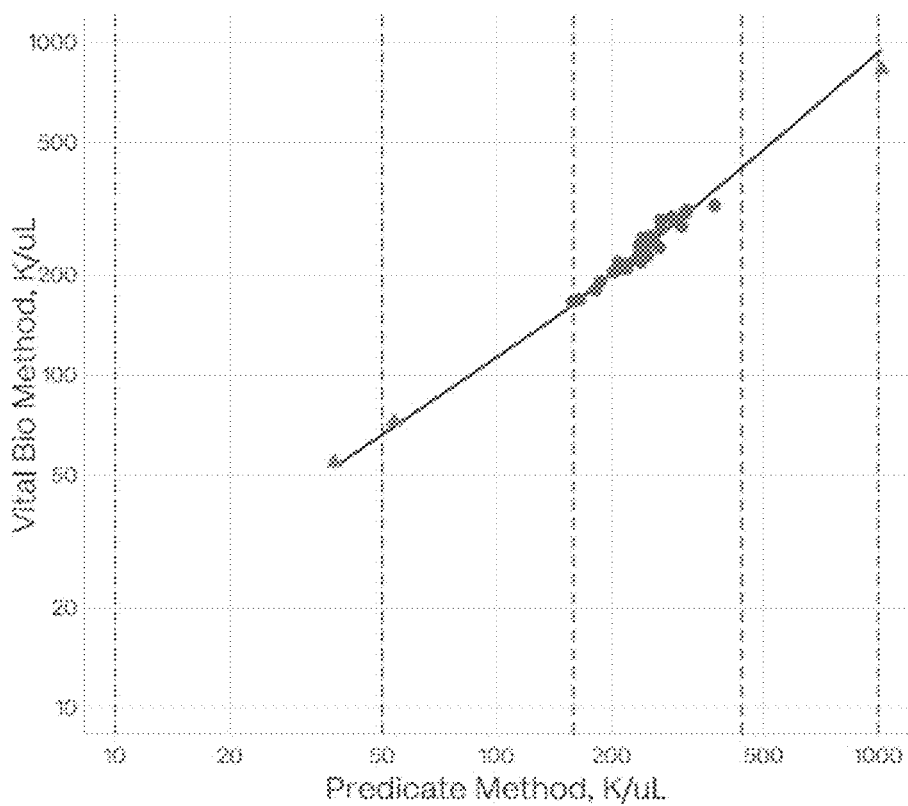
FIGS. 7A and 7B illustrate a comparison of platelet count measured by a device of the present disclosure and a Beckman Coulter DxH 500.
Figure 7B:
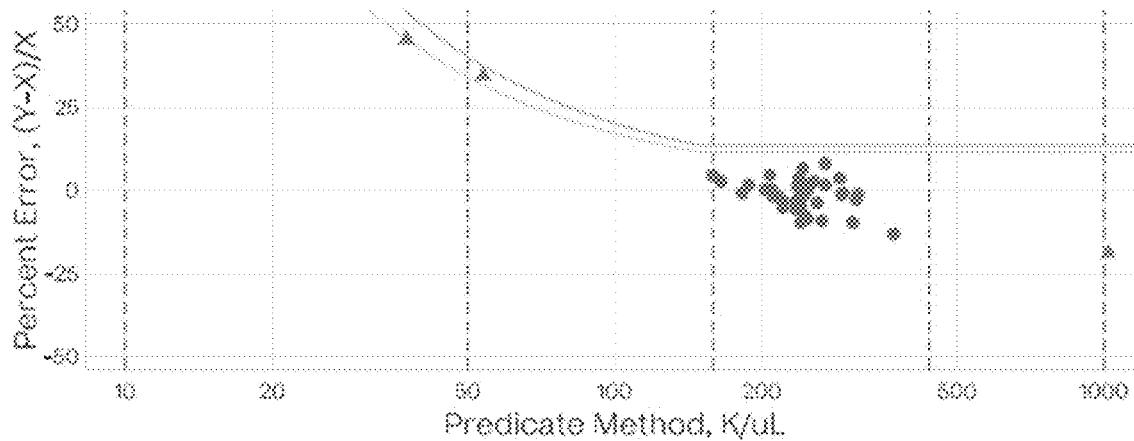

FIG. 7A-B illustrate a comparison of platelet count measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=40.

Figure 8A:
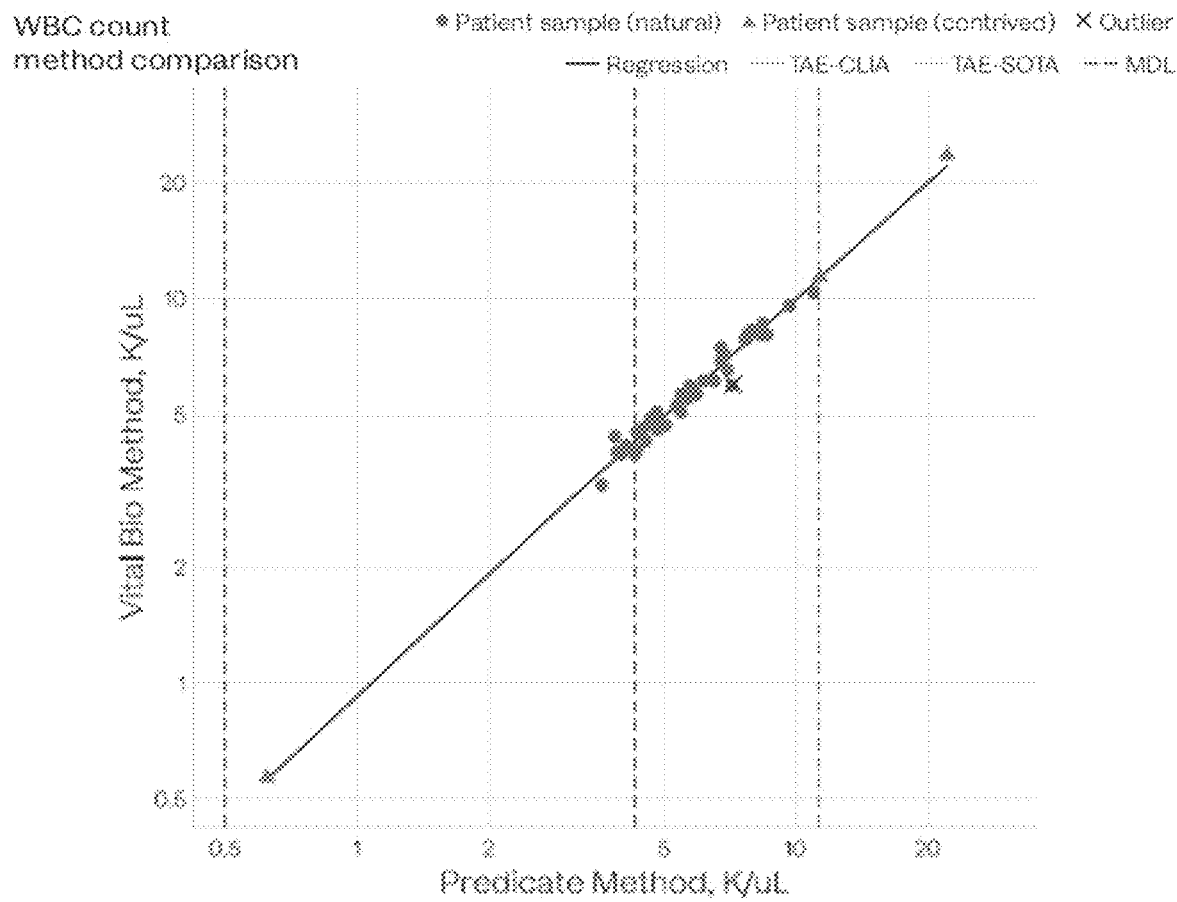
FIGS. 8A and 8B illustrates a comparison of white blood cell count measured by a device of the present disclosure and a Beckman Coulter DxH 500.
Figure 8B:
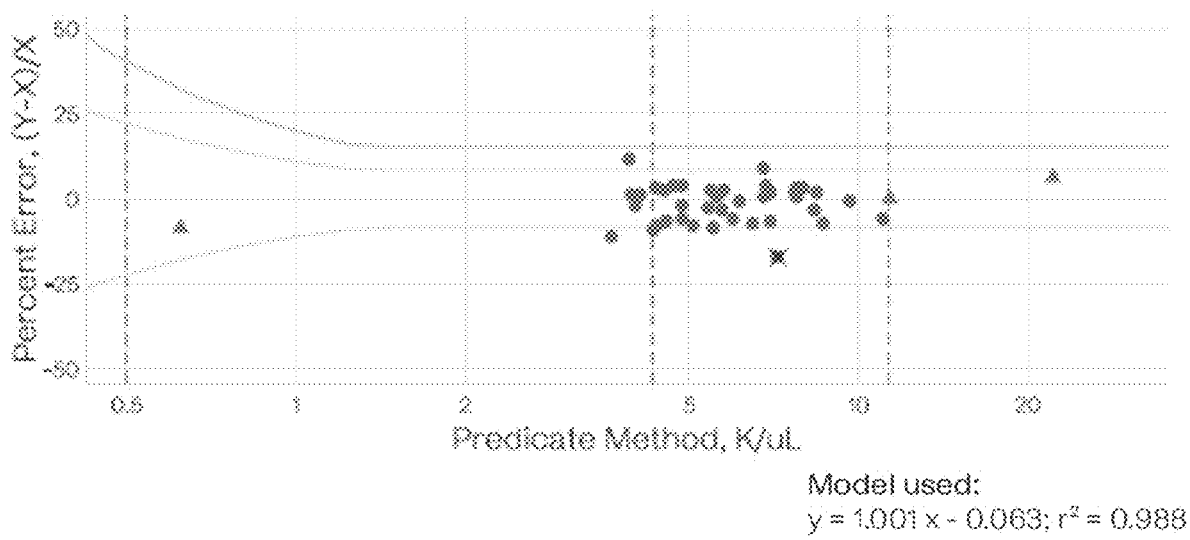

FIG. 8A-B illustrates a comparison of white blood cell count measured by a device of the present disclosure and a Beckman Coulter DxH 500. (A) A method comparison plot with the predicate device on the x-axis. Overlaid on the data are a weighted linear regression and any relevant medical decision levels (MDLs). (B) A Bland-Altman diagram with the Total Allowable Error (TAE) limits as defined by CLIA and the state of the art (SOTA). n=42.

Figure 9A:
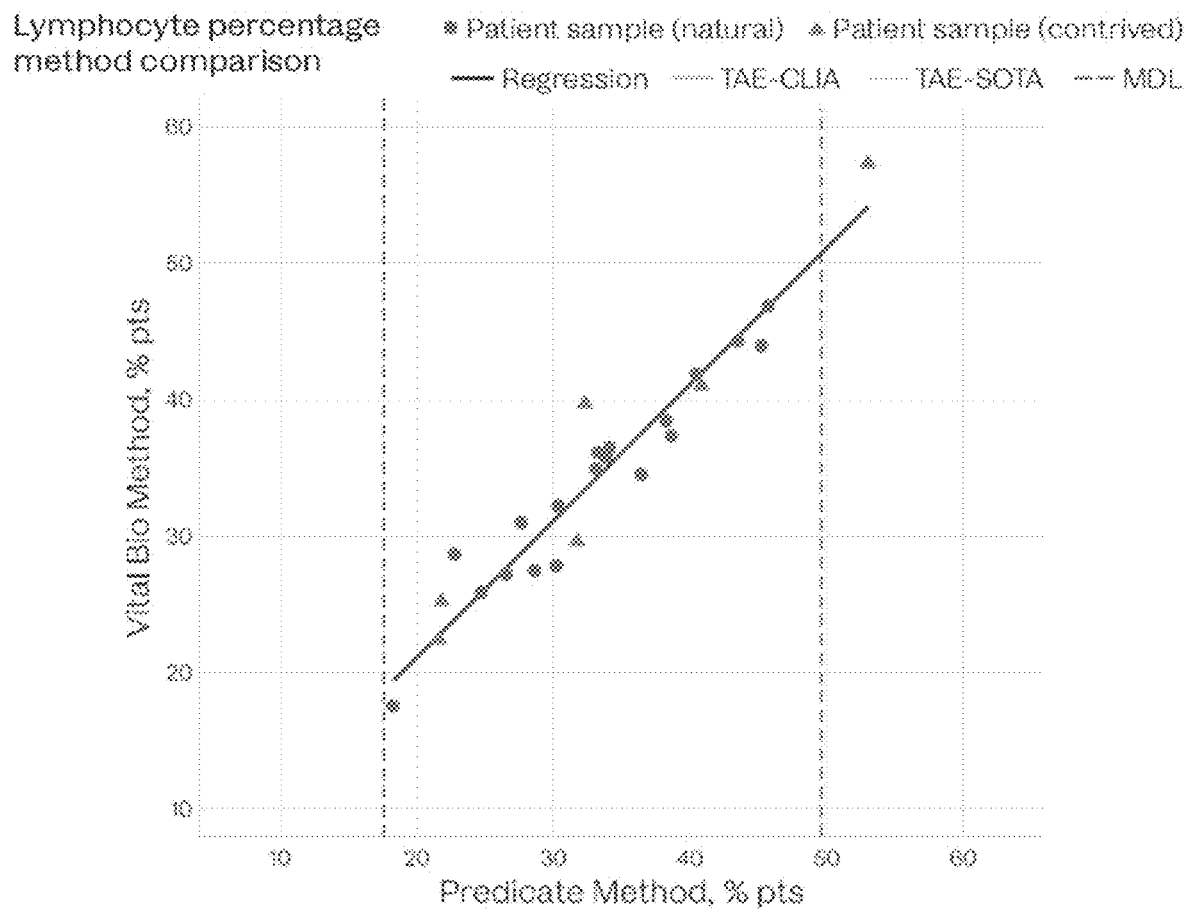
FIGS. 9A and 9B illustrates a comparison of lymphocyte percentage measured by a device of the present disclosure and a Beckman Coulter DxH 500.
Figure 9B:
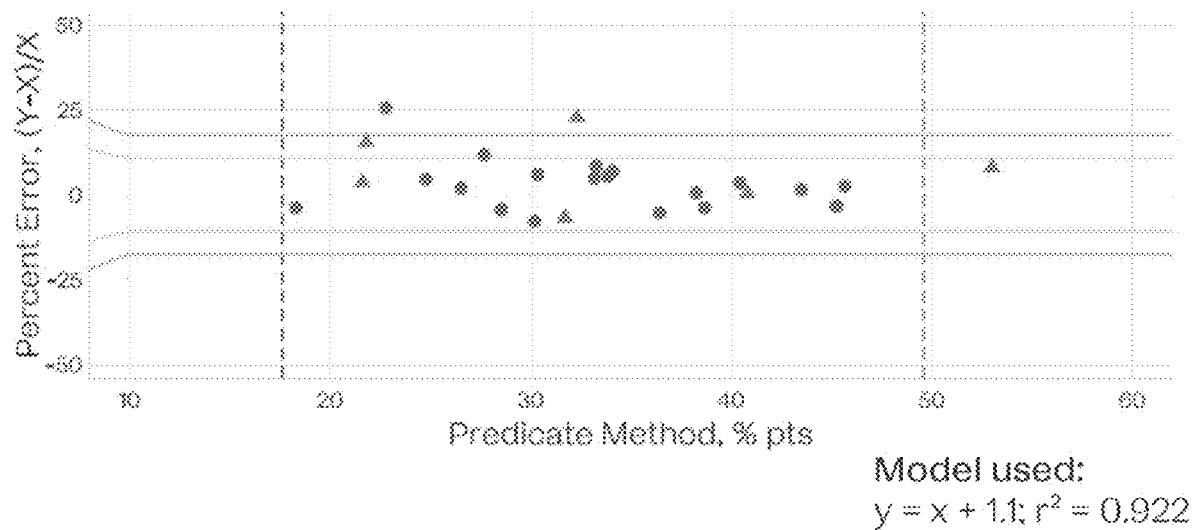

FIG. 9A-B illustrates a comparison of lymphocyte percentage measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 10A:
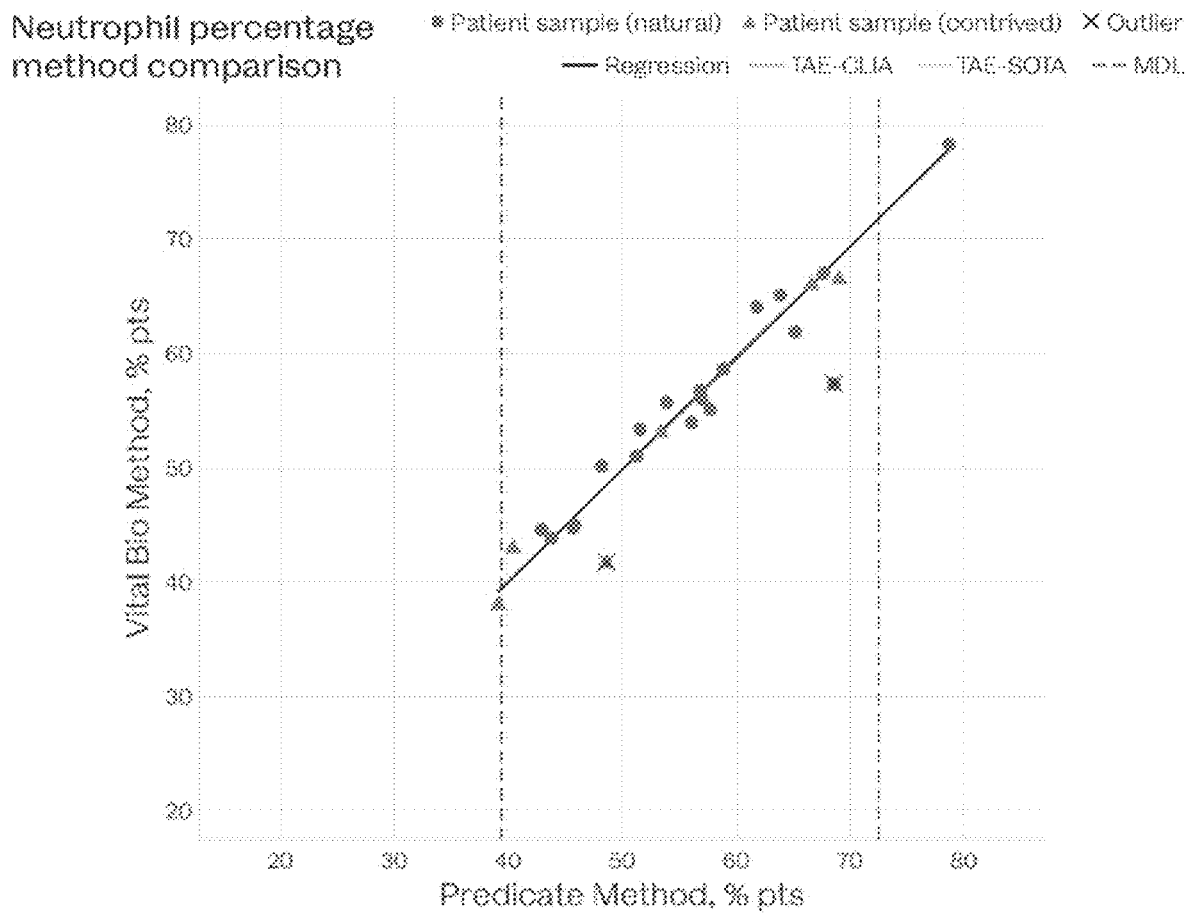
FIGS. 10A and 10B illustrates a comparison of neutrophil percentage measured by a device of the present disclosure and a Beckman Coulter DxH 500.
Figure 10B:
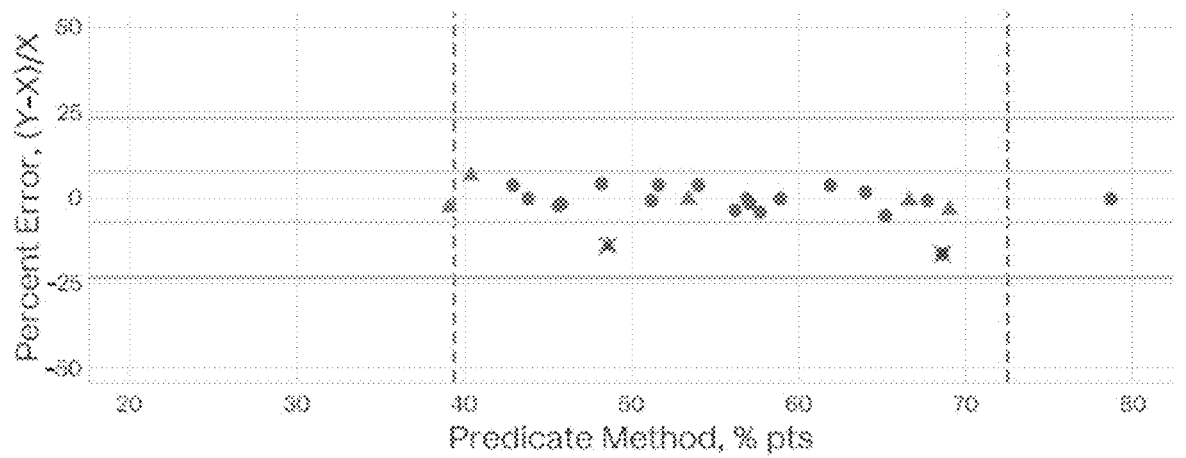

FIG. 10A-B illustrates a comparison of neutrophil percentage measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 11A:
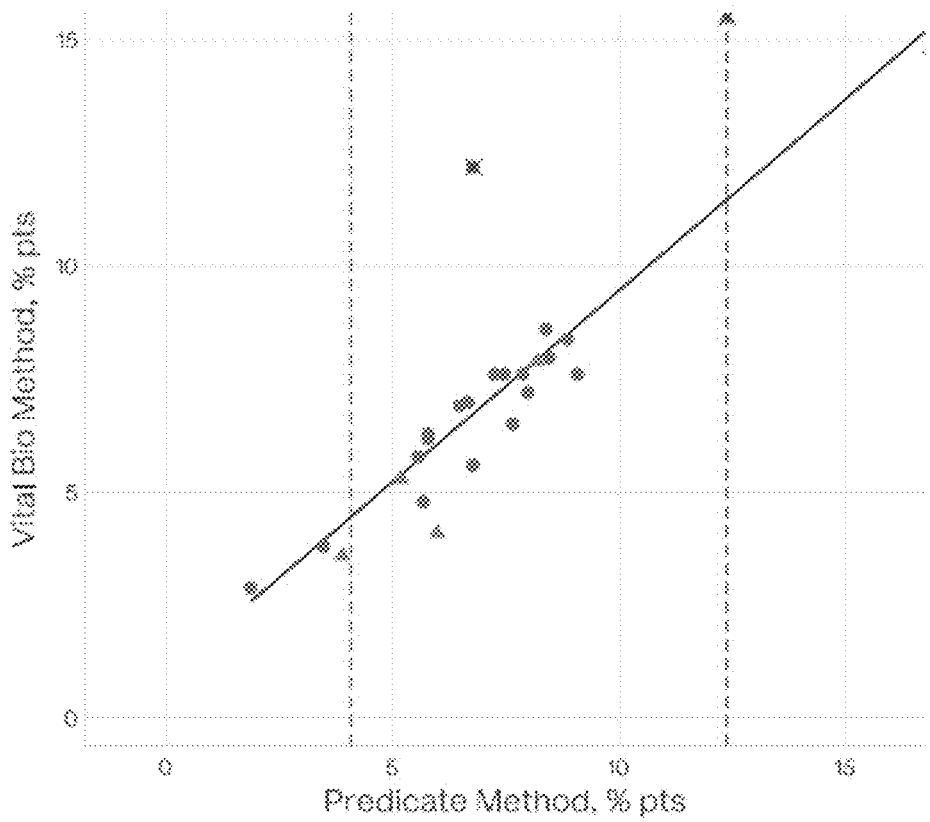
FIGS. 11A and 11B illustrates a comparison of monocyte percentage measured by a device of the present disclosure and a Beckman Coulter DxH 500.
Figure 11B:
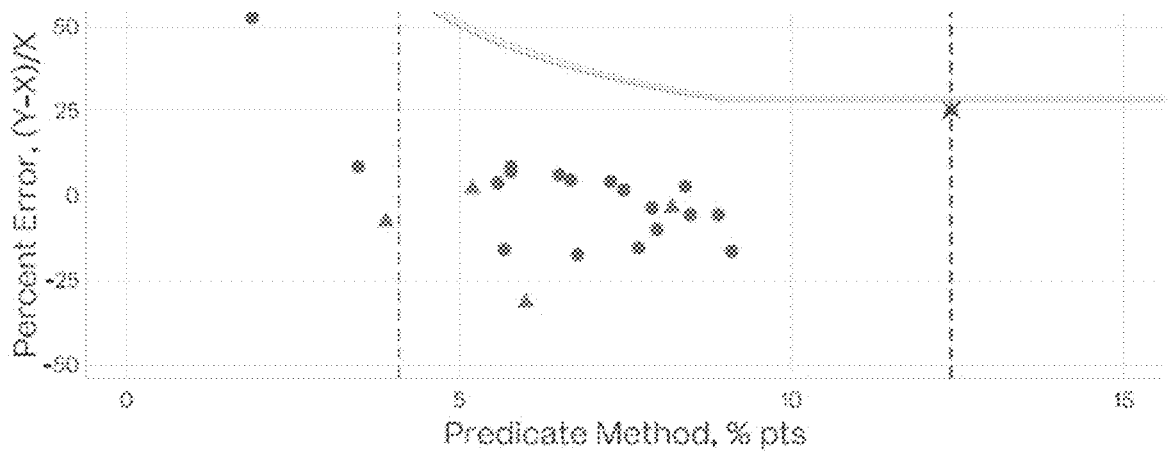

FIG. 11A-B illustrates a comparison of monocyte percentage measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 12A:
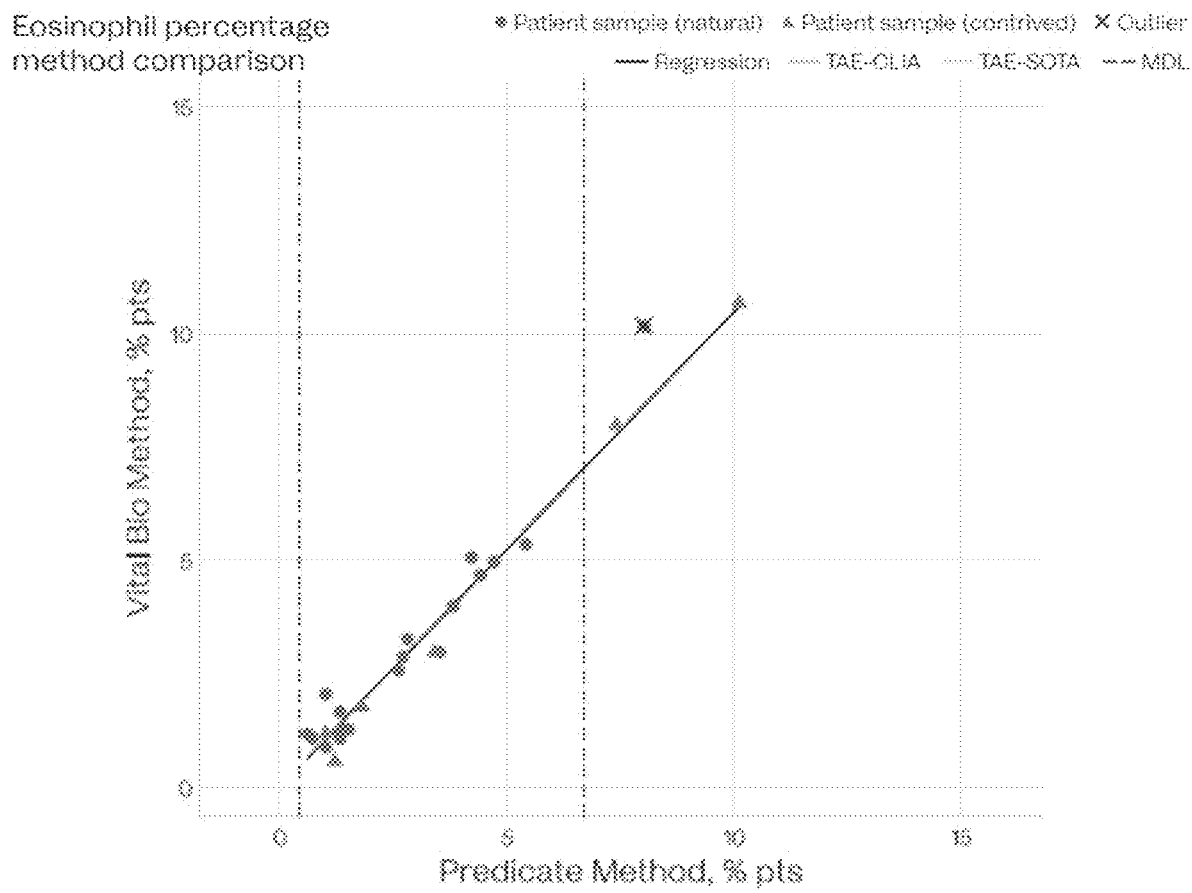
FIGS. 12A and 12B illustrates a comparison of eosinophil percentage measured by a device of the present disclosure and a Beckman Coulter DxH500.
Figure 12B:
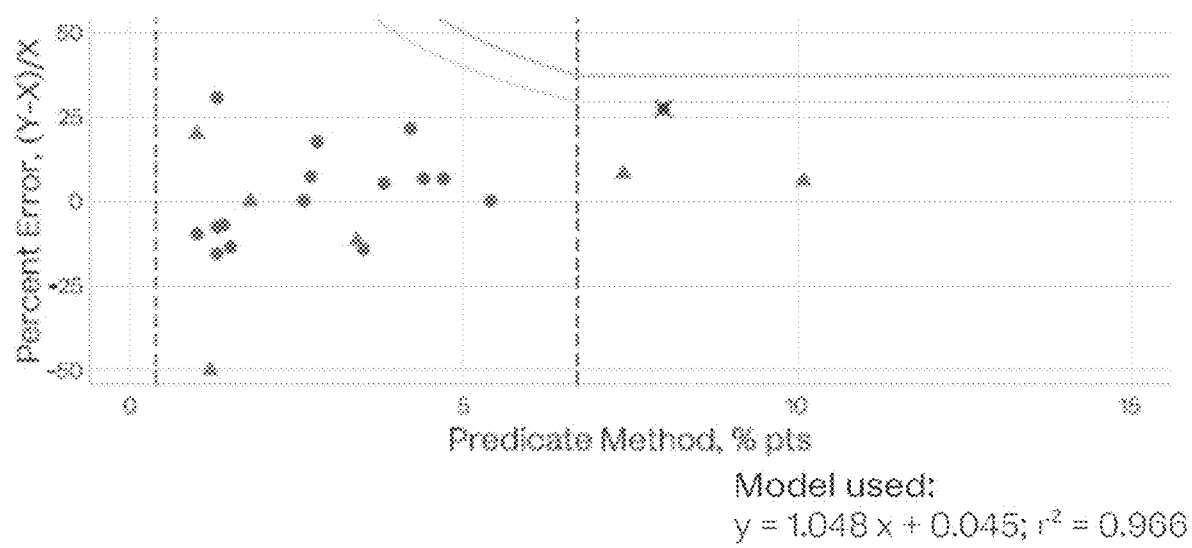

FIG. 12A-B illustrates a comparison of eosinophil percentage measured by a device of the present disclosure and a Beckman Coulter DxH500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 13A:
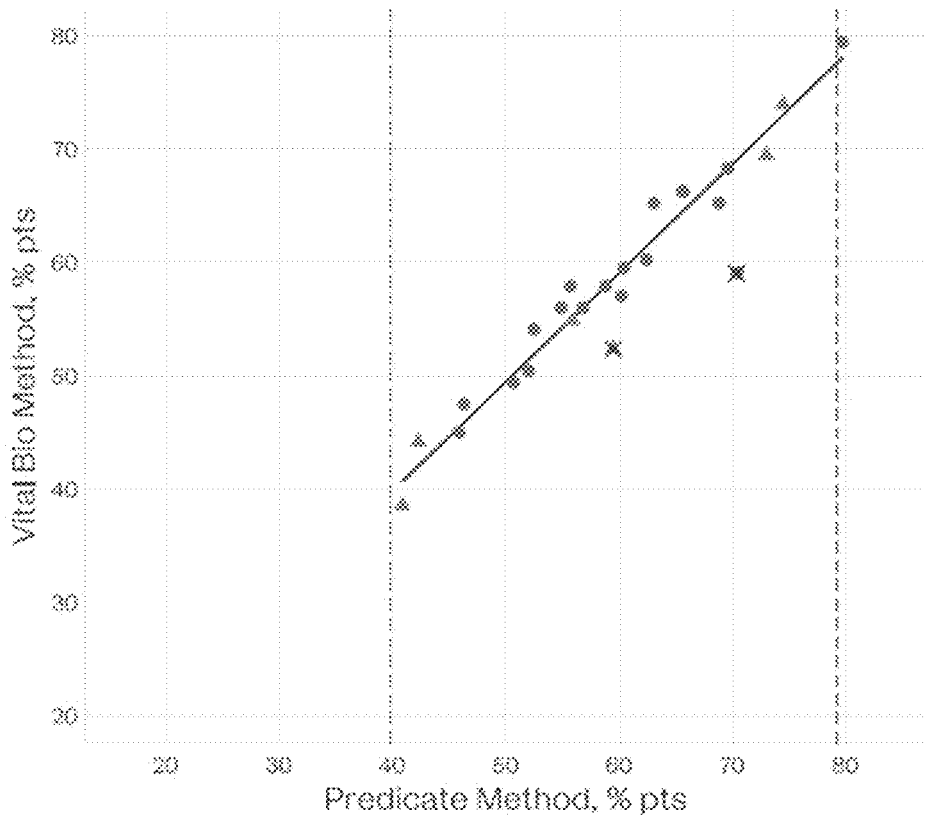
FIGS. 13A and 13B illustrates a comparison of granulocyte percentage measured by a device of the present disclosure and a Beckman Coulter DxH 500.
Figure 13B:
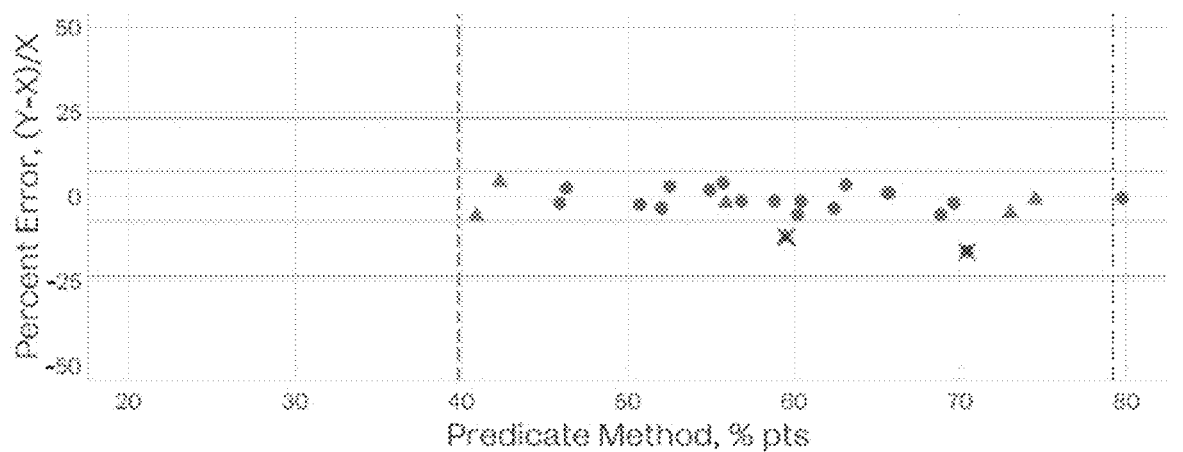

FIG. 13A-B illustrates a comparison of granulocyte percentage measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 14A:
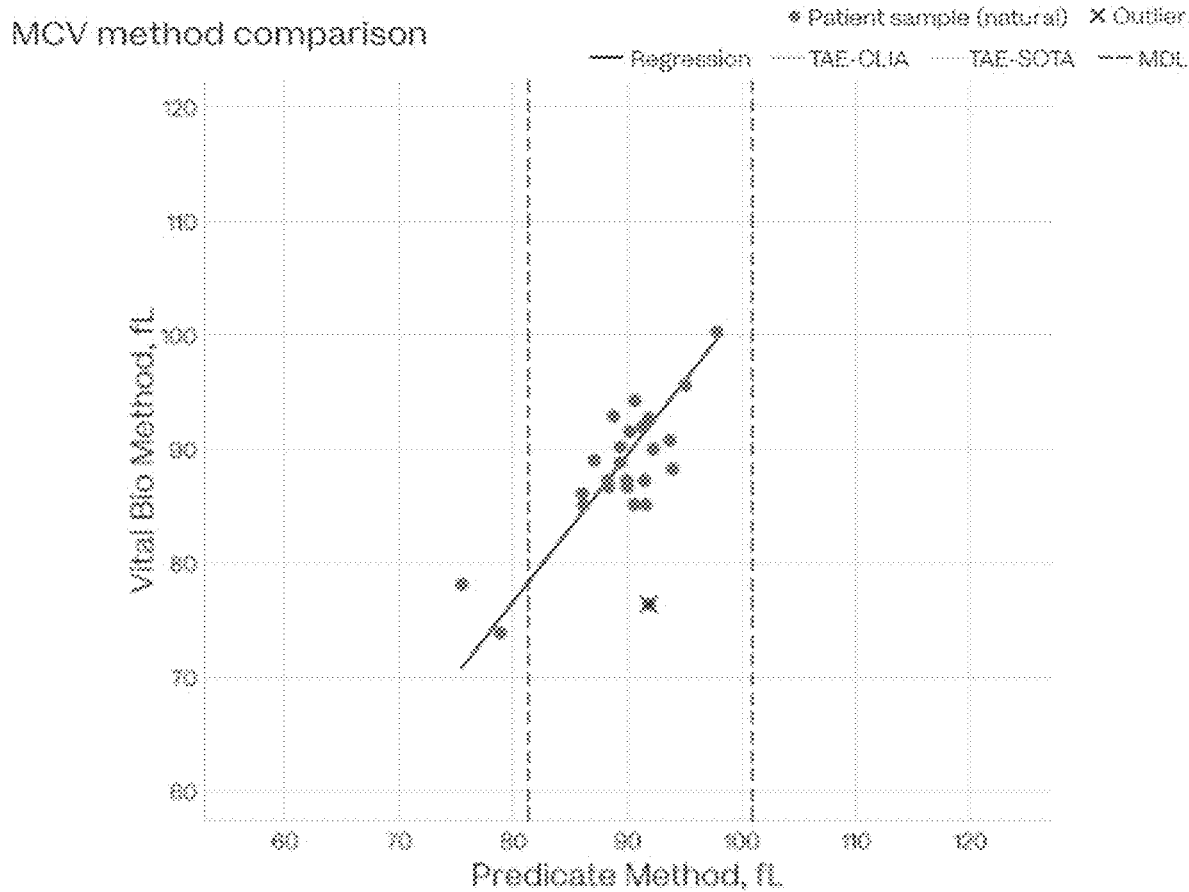
FIGS. 14A and 14B illustrates a comparison of mean corpuscular volume measured by a device of the present disclosure and a Beckman Coulter DxH 500.
Figure 14B:
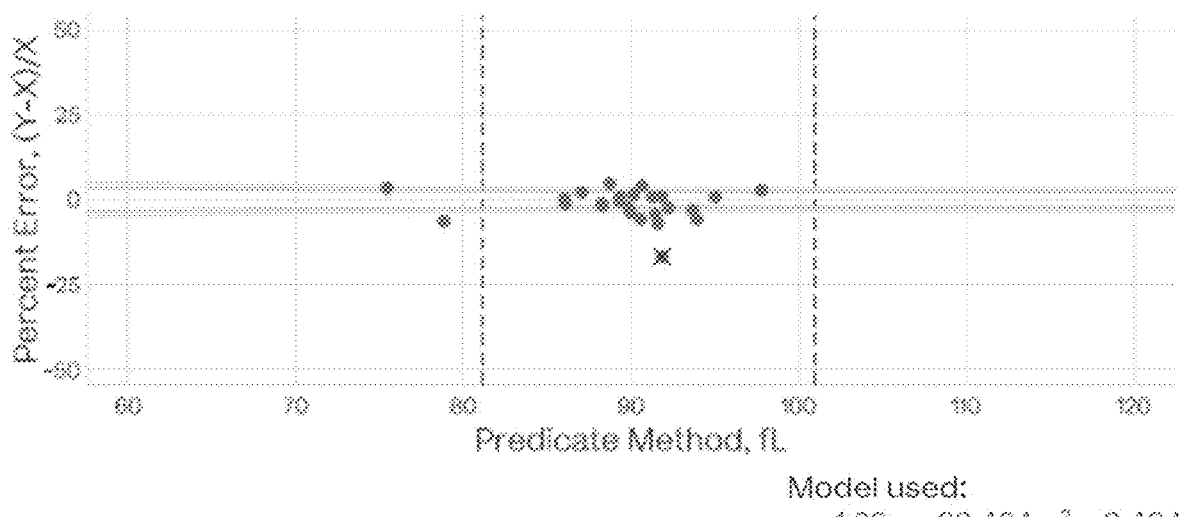

FIG. 14A-B illustrates a comparison of mean corpuscular volume measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 15A:
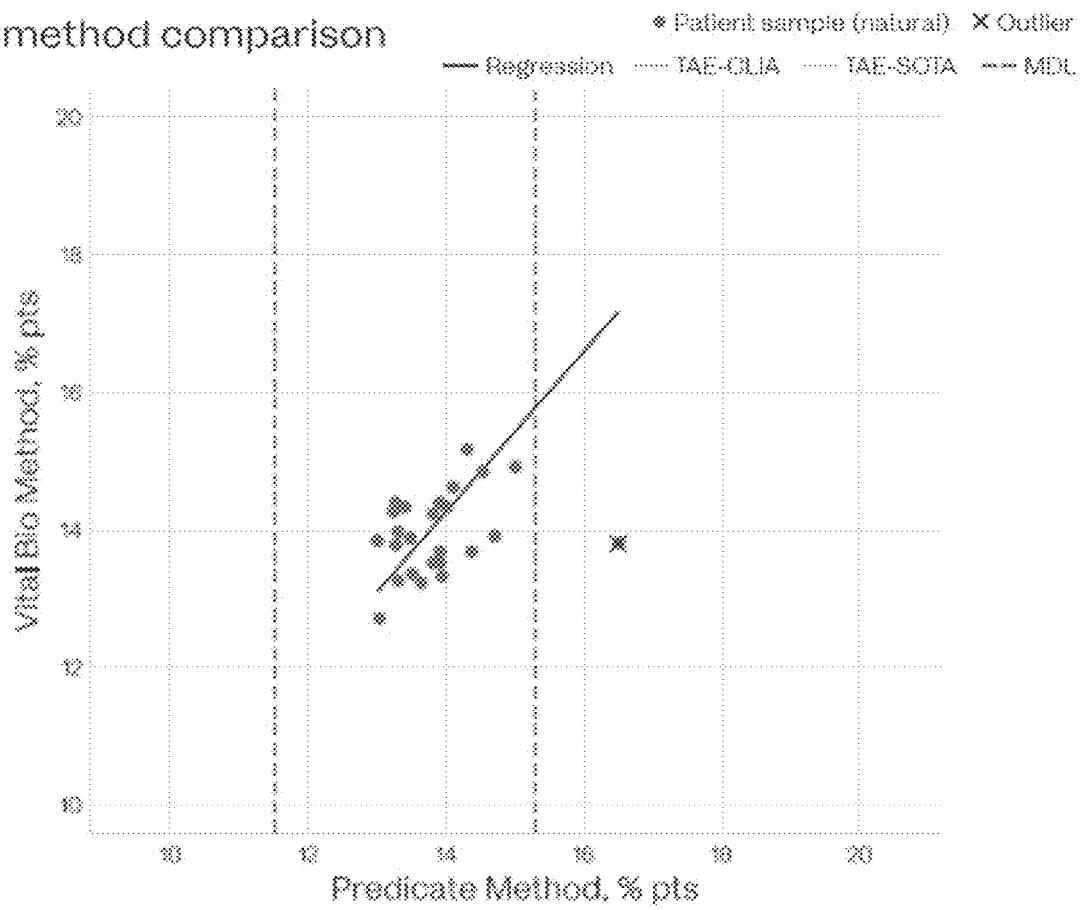
FIGS. 15A and 15B illustrates a comparison of red cell distribution measured by a device of the present disclosure and a Beckman Coulter DxH 500.
Figure 15B:
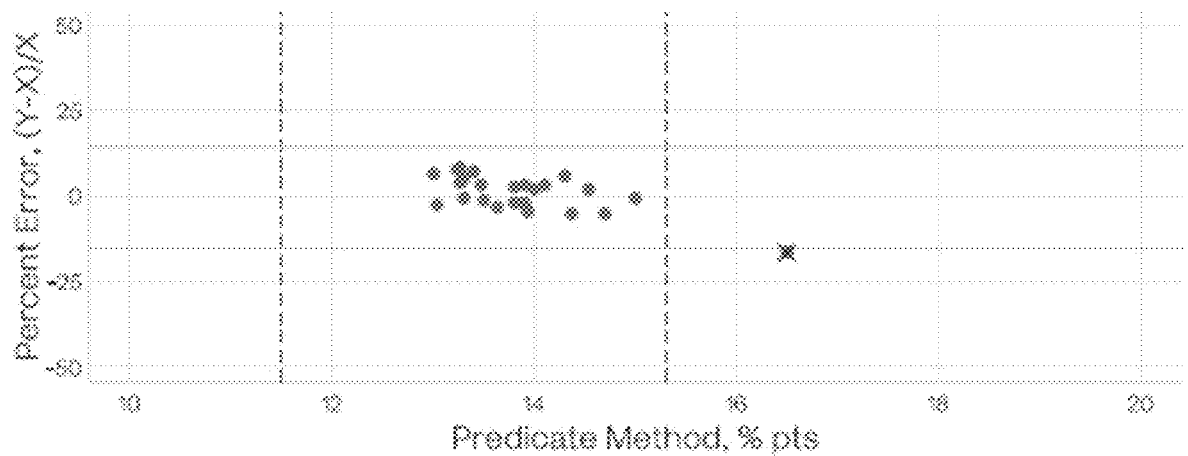

FIG. 15A-B illustrates a comparison of red cell distribution measured by a device of the present disclosure and a Beckman Coulter DxH 500. (A) A method comparison plot with the predicate device on the x-axis. Overlaid on the data are a Passing-Bablok regression and any relevant medical decision levels (MDLs). (B) A Bland-Altman diagram with the Total Allowable Error (TAE) limits as defined by CLIA and the state of the art (SOTA). n=25.

Figure 16A:
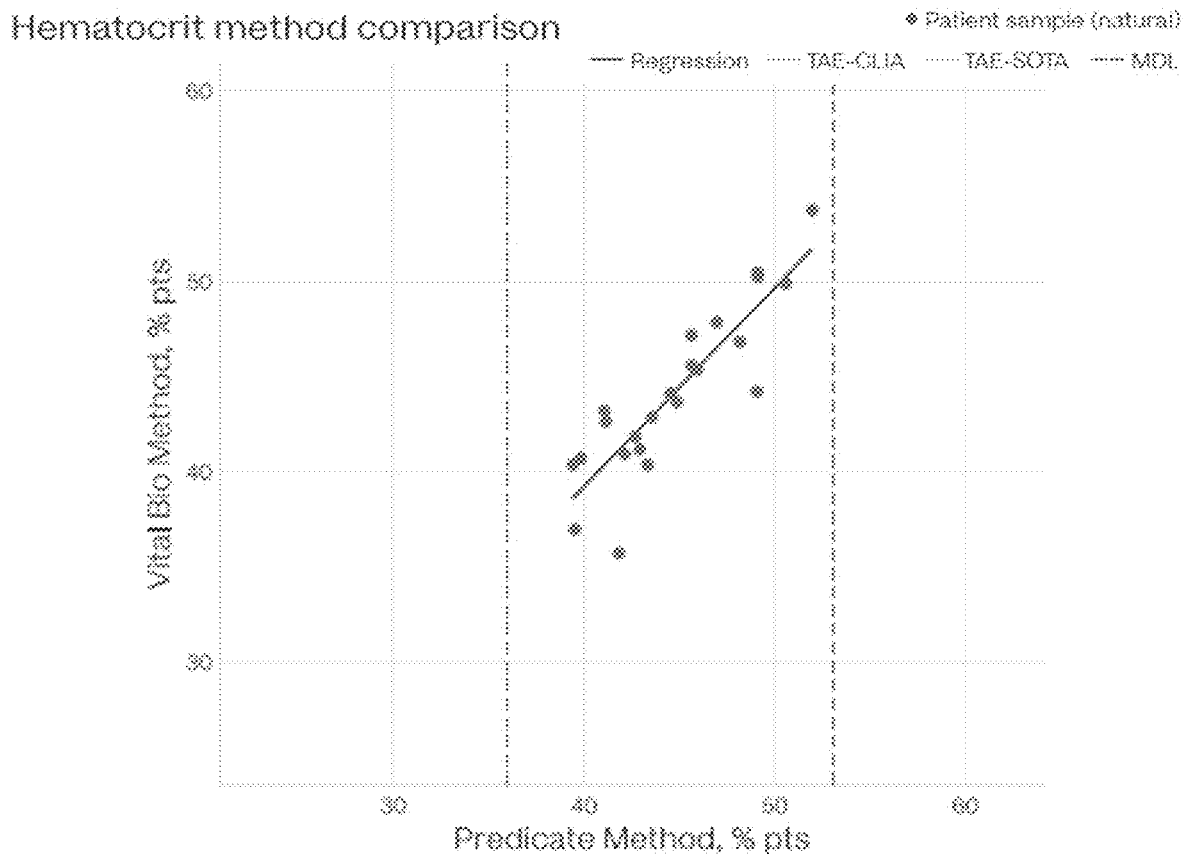
FIGS. 16A and 16B illustrates a comparison of hematocrit measured by a device of the present disclosure and a Beckman Coulter DxH 500.
Figure 16B:
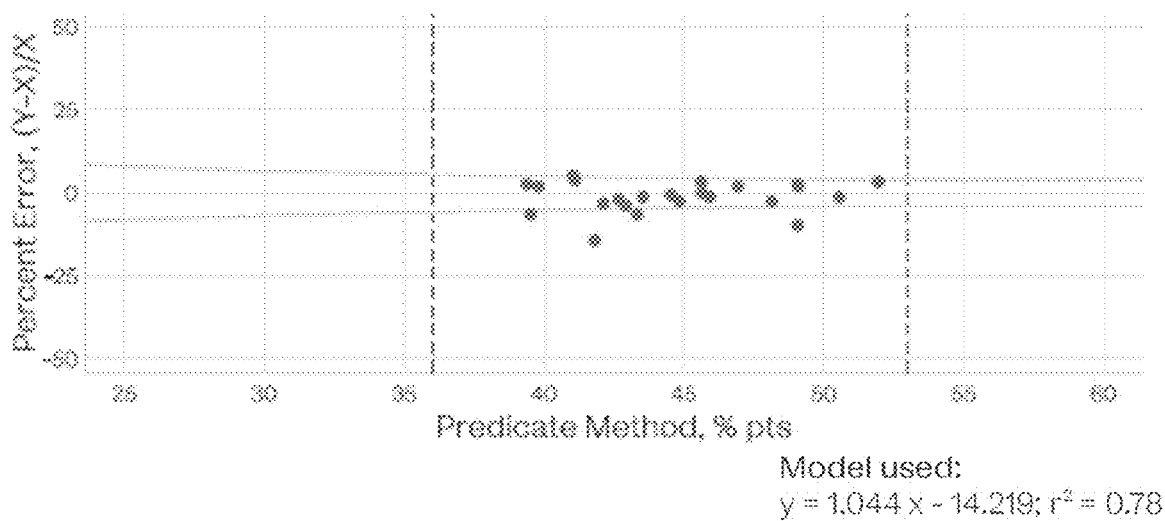

FIG. 16A-B illustrates a comparison of hematocrit measured by a device of the present disclosure and a Beckman Coulter DxH 500. (A) A method comparison plot with the predicate device on the x-axis. Overlaid on the data are a weighted linear regression and any relevant medical decision levels (MDLs). (B) A Bland-Altman diagram with the Total Allowable Error (TAE) limits as defined by CLIA and the state of the art (SOTA). n=23.

EQUIVALENTS

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

Those skilled in the art will recognize, or be able to ascertain, using no more than routine experimentation, numerous equivalents to the specific embodiments described specifically herein. Such equivalents are intended to be encompassed in the scope of the following claims.

RELATED APPLICATIONS AND INCORPORATION BY REFERENCE

This application is related to U.S. Pat. No. 10,413,184, which is incorporated by reference herein in its entirety for all purposes.

All patents and publications referenced herein are hereby incorporated by reference in their entireties. The publications discussed herein are provided solely for their disclosure prior to the filing date of the present application. Nothing herein is to be construed as an admission that the present invention is not patentable in view of such publications.

As used herein, all headings are simply for organization and are not intended to limit the disclosure in any manner. The content of any individual section may be equally applicable to all sections.

What is claimed is:

1. A method for analyzing blood, the method comprising:
    obtaining a first plurality of pixelated images of a first imaging chamber holding a first plurality of blood cells from a biological sample, wherein each respective pixelated image in the first plurality of pixelated images is collected at a different wavelength of electromagnetic (EM) radiation in a first plurality of wavelengths of EM radiation;
    identifying, for each respective blood cell in the first plurality of blood cells, a corresponding set of pixels in each respective pixelated image in the first plurality of pixelated images corresponding to the respective blood cell;
    determining, for each respective blood cell in the first plurality of blood cells, a corresponding imaging feature of the respective blood cell from each respective pixelated image in the first plurality of pixelated images based on pixel values for the corresponding set of pixels corresponding to the respective blood cell in the respective pixelated image, thereby obtaining a corresponding set of imaging features for each respective blood cell in the first plurality of blood cells; and
    applying, to each corresponding set of imaging features for each respective blood cell in the first plurality of blood cells, a first model for identifying a type of the respective blood cell, thereby determining an aggregate count of each blood cell type present in the first plurality of blood cells.

2. The method of claim 1, wherein the first model distinguishes between red blood cells and platelets.

3. The method of claim 1, wherein the first model distinguishes between red blood cells, white blood cells, and platelets.

4. The method of claim 1, wherein the first model is a machine learning model.

5. The method of claim 1, the method further comprising:
    obtaining a second plurality of pixelated images of a second imaging chamber holding a second plurality of blood cells from the biological sample, wherein each respective pixelated image in the second plurality of pixelated images is collected at a different wavelength of electromagnetic (EM) radiation in a second plurality of wavelengths of EM radiation;
    identifying, for each respective blood cell in the second plurality of blood cells, a corresponding set of pixels in each respective pixelated image in the second plurality of pixelated images corresponding to the respective blood cell;
    determining, for each respective blood cell in the second plurality of blood cells, a corresponding imaging feature of the respective blood cell from each respective pixelated image in the second plurality of pixelated images based on pixel values for the corresponding set of pixels corresponding to the respective blood cell in the respective pixelated image, thereby obtaining a corresponding set of imaging features for each respective blood cell in the second plurality of blood cells; and
    applying, to each corresponding set of imaging features for each respective blood cell in the second plurality of blood cells, a second model for identifying a type of the respective blood cell, thereby determining an aggregate count of each blood cell type present in the second plurality of blood cells.

6. The method of claim 5, wherein the second model distinguishes between different types of white blood cells.

7. The method of claim 5, wherein the second model distinguishes between neutrophils, lymphocytes, monocytes, eosinophils, and basophils.

8. The method of claim 5, wherein the second model is a machine learning model.

* * * * *